(12) United States Patent
Chantz

(10) Patent No.: US 11,507,077 B2
(45) Date of Patent: Nov. 22, 2022

(54) DATA ANALYSIS FOR SELECTING CONTAINER WITH INTEGRATED ENERGY SOURCE BASED ON PREDICTED TRANSPORT ENERGY USAGE

(71) Applicant: INTERNATIONAL BUSINESS MACHINES CORPORATION, Armonk, NY (US)

(72) Inventor: Hyman David Chantz, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 16/752,749

(22) Filed: Jan. 27, 2020

(65) Prior Publication Data
US 2021/0232134 A1    Jul. 29, 2021

(51) Int. Cl.
*G05D 1/00* (2006.01)
*B64C 39/02* (2006.01)
*G05D 1/02* (2020.01)

(52) U.S. Cl.
CPC ......... *G05D 1/0005* (2013.01); *B64C 39/024* (2013.01); *G05D 1/0202* (2013.01); *B64C 2201/042* (2013.01); *B64C 2201/128* (2013.01)

(58) Field of Classification Search
None
See application file for complete search history.

(56) References Cited

U.S. PATENT DOCUMENTS 8,469,310 B2   6/2013   Glaser et al.
2018/0105063 A1   4/2018   Wei et al.
(Continued)

FOREIGN PATENT DOCUMENTS

FR          3 035 870 A1    11/2016
WO    WO 2019/086919 A1    5/2019

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

*Primary Examiner* — Yuen Wong
*Assistant Examiner* — Hongye Liang
(74) *Attorney, Agent, or Firm* — Michael A. Petrocelli, Esq.; Kevin P. Radigan, Esq; Heslin Rothenberg Farley & Mesiti P.C.

(57) ABSTRACT

Product transport is facilitated by a processor(s) obtaining data related to a planned transport event, and analyzing the data to predict energy usage of a transport vehicle in performing the planned transport event, including transporting one or more transport containers. The processor(s) determine, based at least in part on the predicted energy usage, an energy source size for a transport container of the transport container(s) to be transported by the transport vehicle, and determine whether the transport vehicle is to proceed with the transport event. The determining whether to proceed is based, at least in part, on the processor(s) determining that an energy source of the determined energy source size is integrated within the transport container, with the integrated energy source being adapted in the container to contribute energy to the transport vehicle when the transport container is positioned within the transport vehicle for transport.

20 Claims, 16 Drawing Sheets

(56) References Cited

U.S. PATENT DOCUMENTS

2020/0055421 A1* 2/2020 Sastinsky ............... H04L 67/10
2020/0254901 A1* 8/2020 Leger ............... G06Q 10/08355
2021/0158186 A1* 5/2021 Mimaroglu ............ G06N 20/00

* cited by examiner

DATA ANALYSIS FOR SELECTING CONTAINER WITH INTEGRATED ENERGY SOURCE BASED ON PREDICTED TRANSPORT ENERGY USAGE

BACKGROUND

It is desirable for transportation of product or cargo in all forms, whether by air, water or land, to increasingly to be environmentally sustainable and ecologically sound. This has resulted in an ever-expanding use of electric drives, as well as ecologically sound fuels, such as hydrogen.

Fossil fuels such as gasoline, aviation gas, and diesel fuel, have an approximately 50 times greater energy density and specific energy compared with many batteries or common renewable fuels. Thus, even though batteries can deliver energy more efficiently and with less pollution and heat to electric motors, the range of electric transport vehicles, such as land vehicles, aircrafts, ships, unmanned aerial vehicles (UAV), unmanned ground vehicles (UGV), etc., remains limited. For instance, an issue to be addressed for a practical implementation of an electric unmanned aerial vehicle (UAV) for a drone-based delivery system, is that the current state of the art drones have limited travel ranges, as well as limited carrying capacity.

SUMMARY

Certain shortcomings of the prior art are overcome and additional advantages are provided through the provision, in one or more aspects, of a method of facilitating product transport. The method includes obtaining, by one or more processors, data related to a planned transport event, and analyzing, by the one or more processors, the data to predict energy usage of a transport vehicle in performing the planned transport event, including transporting one or more transport containers. The method also includes determining, by the one or more processors, based at least in part on the predicted energy usage, an energy source size for a transport container of the one or more transport containers to be transported by the transport vehicle, and determining whether the transport vehicle is to proceed with the planned transport event of transporting of the transport container(s). The determining whether to proceed is based, at least in part, on the processor(s) determining that an energy source of the determined energy source size is integrated within the transport container, and the integrated energy source is adapted in the transport container to contribute energy to the transport vehicle with the transport container positioned within the transport vehicle for transport.

Systems and computer program products relating to one or more aspects are also described and claimed herein. Further, services relating to one or more aspects are also described and may be claimed herein.

Additional features are realized through the techniques described herein. Other embodiments and aspects are described in detail herein, and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
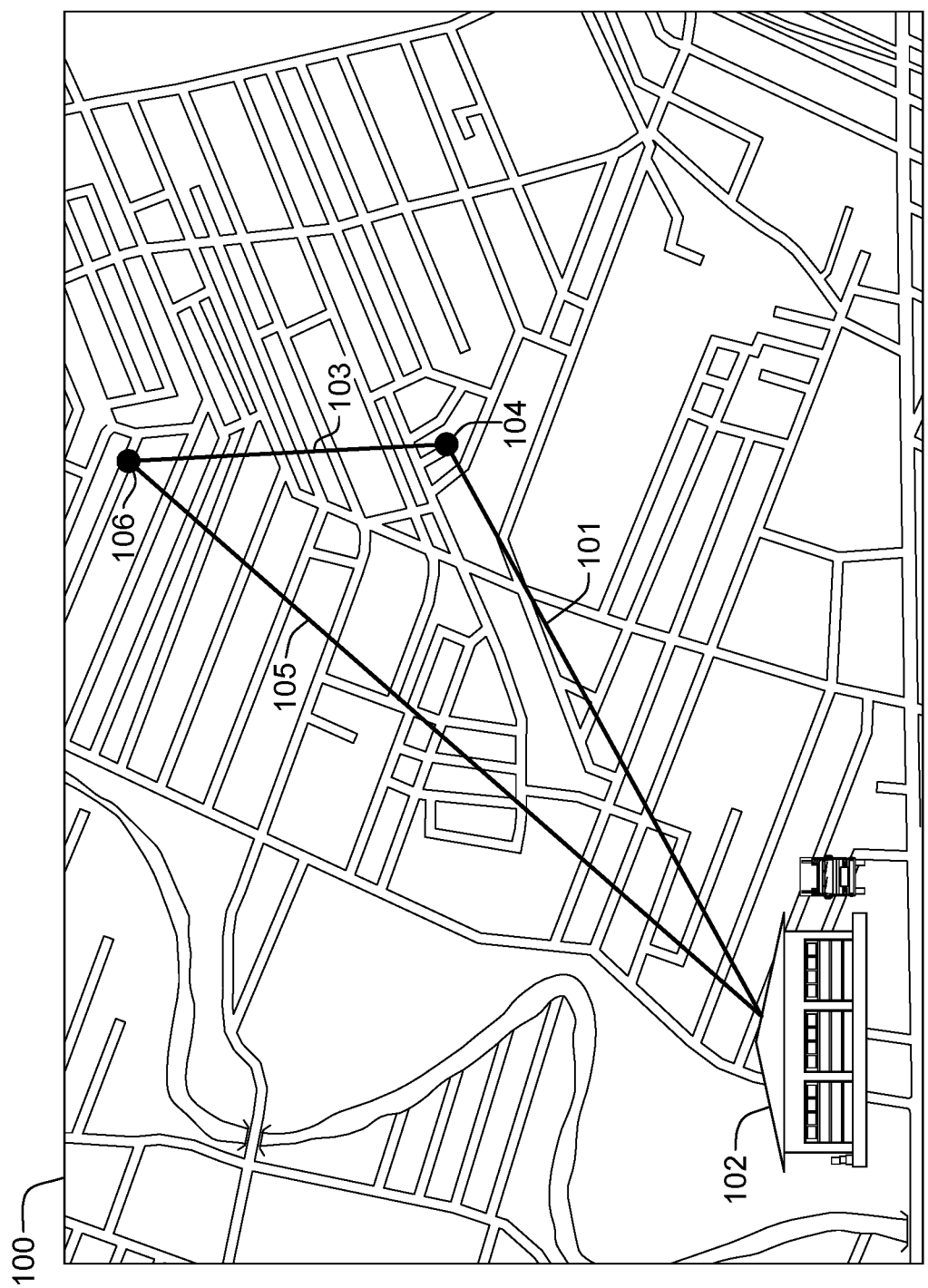
FIG. 1 illustrates one embodiment of alternate travel routes for product delivery by a drone transport vehicle accommodating multiple containers, one or more of which have an integrated energy source, in accordance with one or more aspects of the present invention.

The accompanying figures, in which like reference numerals refer to identical or functionally similar elements throughout the separate views, and which are incorporated in and form a part of the specification, further illustrate the present invention and, together with the detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 11:
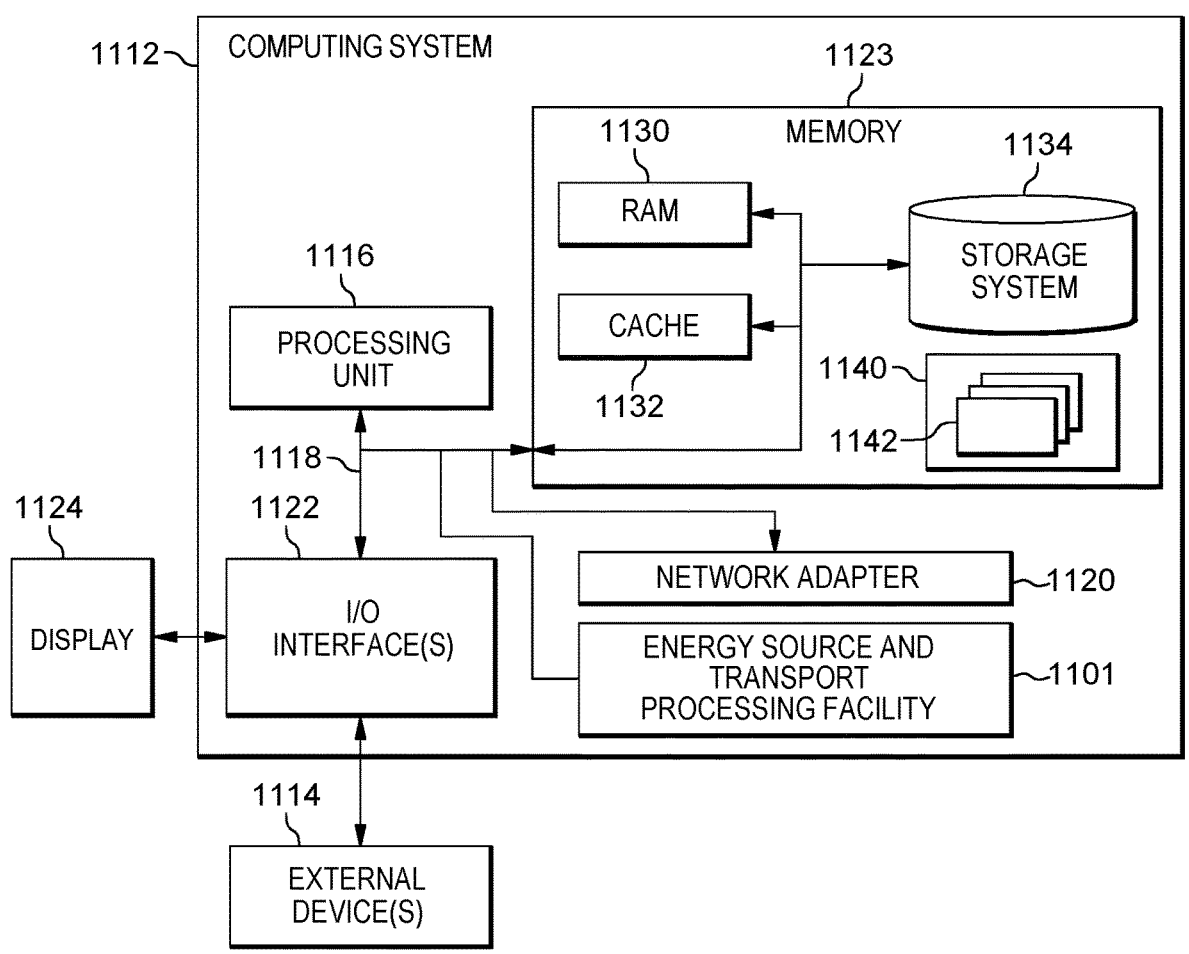
FIG. 11 depicts one embodiment of a computing node or system to implement or facilitate implementing energy and transport processing, in accordance with one or more aspects of the present invention.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 11 as program/utility 1140, having a set (at least one) of program modules 1142, which can be stored in memory 1123.

Embodiments of the present invention include a computer-implemented method, a computing system, and a computer program product, where program code executing on one or more processors obtains data related to a planned product transport event, and analyzes the data to predict energy usage of a transport vehicle in performing the transport event, including transporting one or more transport containers. Embodiments of the present invention further include program code that determines, based at least in part on the predicted energy usage, an energy source size for a transport container of the one or more transport containers to be transported by the transport vehicle. Note in this regard that, "size" refers generally to an amount of available energy, which can correlate, in one or more embodiments, to physical size and/or configuration of the energy source being incorporated into the transport container. Embodiments of the present invention also include program code that determines whether the transport vehicle is to proceed with the planned transport event of transporting the transport container(s) based, at least in part, on the program code determining that an energy source of the determined energy source size is integrated within the transport container, with the integrated energy source being adapted in the container to contribute energy to the transport vehicle when the transport container is positioned within the transport vehicle for transport.

In certain embodiments of the present invention, the transport vehicle has an associated transport vehicle energy source, and the integrated energy source within the transport container is a supplemental energy source to the transport vehicle energy source. In one or more embodiments of the present invention, the program code determines the energy source size for the transport container to be transported by the transport vehicle based, at least in part, on a transport route to be taken by the transport vehicle in performing the planned transport event, and on available energy of the transport vehicle energy source. In one or more embodiments, the transport vehicle is to transport multiple transport containers with respective integrated energy sources, and the program code controls use of energy from the respective integrated energy sources by the transport vehicle during transport, including the program code determining the transport route and using, at least in part, energy from one or more of the respective integrated energy sources to power the transport vehicle prior to delivery thereof.

In one or more embodiments, the method includes integrating, or confirming integrating, of the energy source into the transport container to be able to contribute energy to the transport vehicle during the transport event. In one implementation, the transport vehicle is an electric transport vehicle, and the energy source is a battery. Further, in one embodiment, the program code confirms that the battery integrated in the transport container is in a charged state prior to the transport event.

In one or more implementations, the program code obtains battery type data, and determines, based at least in part on the predicted energy usage, a battery type for the energy source using the battery type data, where the battery is of a determined battery type, and the battery type is one battery type of multiple battery types available for integration into the transport container.

In one or more embodiments, the data obtained by the program code includes battery-specific data, and the program code evaluates the battery-specific data, including specified data for a particular battery, historical use data for the particular battery, and charge test data for the particular battery, where the particular battery is the integrated energy source within the transport container. In one implementation, the obtaining of the battery data includes receiving by the program code the battery data, at least in part, within a blockchain block.

In certain embodiments of the present invention, the transport vehicle is to deliver multiple transport containers as part of the planned transport event, and the program code controls an order of delivery of the multiple transport containers and a transport route taken by the transport vehicle in performing the transport event to delay delivery of the transport container with the integrated energy source to obtain additional time in transport for the integrated energy source to contribute energy to the transport vehicle.

Embodiments of the present invention are inextricably tied to computing and provide significantly more than existing approaches to powering a transport vehicle. For instance, embodiments of the present invention provide program code executing on one or more processors to exploit the interconnectivity of various systems, as well as utilize various computing-centric data analysis and handling techniques, in order to predict energy usage of a transport vehicle in transporting one or more containers, and to determine, based at least in part on the predicted energy usage, energy source size for inclusion in a transport container to be transported by the transport vehicle. In one or more implementations, the program code applies a predictive model in order to provide the predicted energy usage, and based thereon, to determine the energy source size for inclusion in the container. Both the interconnectivity of the computing systems utilized and the computer-exclusive data processing techniques utilized by the program code enable various aspects of the present invention. Further, embodiments of the present invention provide significantly more functionality than existing approaches to providing energy for a transport vehicle because, in embodiments of the present invention, the program code predicts, based on data analysis, energy usage of the transport vehicle in performing a planned transport event, including transporting one or more transport containers and determines, based at least in part thereon, an energy source size for a transport container of the one or more transport containers to be transported by the transport vehicle.

In embodiments of the present invention, the program code provides significantly more functionality, including but not limited to: (1) program code that obtains data related to a planned product transport event; (2) program code that analyzes the data to predict energy usage of a transport vehicle in performing the transport event, including transporting one or more transport containers; (3) program code that determines, based at least in part on the predicted energy usage, an energy source size for a transport container to be transported by the transport vehicle; and (4) program code that determines whether the transport vehicle is to proceed with the planned transport event of transporting the container(s). Determining whether to proceed is based, at least in part, on the program code determining that an energy source of the determined energy source size is integrated within the transport container, with the integrated energy source being adapted in the container to contribute energy to the transport vehicle when the transport container is positioned within the transport vehicle for transport.

As noted, transportation of product or cargo in all forms, whether by air, water or land, is increasingly required to be environmentally sustainable and ecologically sound. This has resulted in an ever-expanding use of electric drives, as well as ecologically sound fuels, such as hydrogen. By way of example, batteries, or other common renewable fuels, can be used as an energy source to efficiently (and with less pollution) deliver energy to electric motors. The range of electric-powered transport vehicles, aircraft, ships, unmanned aerial vehicles (UAV), unmanned ground vehicles (UGV), etc., remains an issue. For instance, an electric transport vehicle, such as an unmanned aerial vehicle (UAV) of a drone-based delivery system, often has limited carrying or payload capacity, as well as limited travel range, due at least in part to available energy. System and workflow embodiments are disclosed herein which assist in addressing these issues. In one or more implementations, electrical or other low-pollution energy sources are selected (or tailored) based on multiple considerations, and integrated within a transport container to assist in powering the transport vehicle during transport.

For instance, in certain implementations, one or more transport containers being transported by a transport vehicle have integrated energy sources, sized as described herein, to ensure that the transport vehicle has the required operational range to perform the planned transport event. For instance, at present, over 90% of cargo is shipped in a variety of physical containers. These containers focus on approximately a dozen different container types, used primarily for shipping and trucking, such as 8 feet high, 20 feet wide and 40 feet long, 53 feet long, etc. Additionally, there are approximately a dozen types of different containers used by aircraft, which have standardized outside dimensions and stacking loads, but inside requirements are variable.

Thus, in one or more aspects, disclosed herein is the selection and integration of supplemental energy sources within transport containers themselves, and which are connected to contribute to the energy needs of the transport vehicle in transit. Depending on the product to be transported, and the size of the container, there can be a very small loss of storage capacity, while providing a significant amount of energy storage capability within the container. Note that the integration of supplemental energy sources into the transport containers themselves can be used for fully autonomous transport vehicles, as well as transport vehicles requiring a spectrum of human input. Additionally, for those transport vehicles that have on occasion excess energy, such as might be the case with a vehicle going downhill, the excess energy can be stored by the vehicle energy interface into the energy sources integrated into the transport container(s), if desired.

In one or more embodiments, program code determines the size and type of energy source to be included, such as, the size and type of a battery to be integrated into a transport container to assist in powering the transport vehicle during transport of the transport container. For instance, one type of battery source usable would be an 18650 Lithium-Ion battery in one of a variety of sizes and configurations, depending on the container(s) to be used. For transportation uses, such a battery can be tested by a computer interface, and safety can be provided by both the container energy interface itself, and the transport vehicle energy interface. For instance, a reusable transport container, strengthened for multiple loads and many uses, can be modified or configured to allow for the ready integration of different-sized energy sources into the container, such as different-sized sheet dimensioned batteries within or along the walls of the container. Note that, the description provided herein assumes that direct-current batteries are to be used in association with a container, though other types of energy sources, such as alternating current power arrangements, as well as hydrogen fuel generation and delivery systems, can also be used as energy sources, as desired. In this manner, the amount of energy available, both from the transport vehicle's own energy source, as well as one or more container energy sources, can be tailored to the particular transport event to be accomplished.

By way of example, FIG. 1 depicts one embodiment of a map illustrating alternate transport routes or paths for an aerial transport vehicle to take in delivering two containers, each to a different location. Those skilled in the art will appreciate in this regard that one or more aspects of the present invention are described herein by way of example only with reference to an unmanned aerial vehicle, such as a drone. In particular, the aspects disclosed herein can be used with a transport vehicle of any form, whether aircraft, land vehicle, ship, etc., and whether manned or unmanned. Further, the transport vehicles described herein transport one or more transport containers which contain product or cargo to be moved from one location to another location. Depending on the size and weight of the containers and products, multiple transport containers can be loaded into or on a single transport vehicle, such as a single aerial drone, when suitable. Further, in one or more implementations, multiple products can be disposed within a single transport container. As described further herein, in addition to transporting product, one or more of the transport containers are configured, in one or more embodiments, for the incorporation of one or more energy sources therein (e.g., as wall or floor panels) to provide supplemental energy to the transport vehicle during transport of the container(s).

In FIG. 1, a map 100 of a geographic region is shown. In map 100, the location of a warehouse (a first location) 102 and the locations of multiple delivery points (e.g., user addresses) 104, 106, e.g., associated with user orders, are shown. In one or more embodiments, the transport vehicle can take a counter-clockwise delivery approach along delivery route 101 to delivery point 104, and subsequently along delivery route 103 to delivery point 106, before returning along route 105 to warehouse 102. In an alternate transport route, the transport vehicle can take a clockwise delivery approach by traveling along delivery route 105 to delivery point 106, and subsequently along route 103 to delivery point 104, before returning along route 101 to warehouse 102. In one or more implementations, the particular delivery route selected by the program code can be based, for instance, on whether one or more of the transport containers to be delivered has integrated therewith an energy source, as described herein. Further, in the case where multiple containers have energy sources integrated into the containers, the particular size of the energy sources and the different delivery points can be evaluated by the program code in determining the particular transport route to be taken by the transport vehicle.

For instance, where the transport container to be delivered to delivery point 104 contains an integrated energy source, but the transport container to be delivered to delivery point 106 does not, then the clockwise travel route can be determined by the program code as the best travel route in order to allow for energy from the integrated energy source in the transport container for delivery point 104 to be used by the transport vehicle for a longer period, thus delaying delivery of the transport container to delivery point 104. Further, in the case where each container has an integrated energy source, the size of the particular integrated energy sources can vary, as described herein. In such a case, the size of the respective energy sources capable of contributing energy to the transport vehicle, as well as the respective delivery points, are analyzed by the program code to determine the best transport route to be taken for the particular transport event. In one or more embodiments, the program code and system(s) described herein controls (along with the integration of an energy source of tailored size into the container) the transport vehicle energy usage, and the transport route as described herein and/or otherwise enables or causes the various functionalities to be performed. In one or more implementations, at warehouse 102 (i.e., the first location), one or more transport containers to be delivered are fitted with an energy source sized based on the predicted energy usage of the transport vehicle in transporting the container(s), available energy from other sources, and for the particular travel route to be used, as well as the anticipated travel conditions (depending on the implementation).

Figure 2:
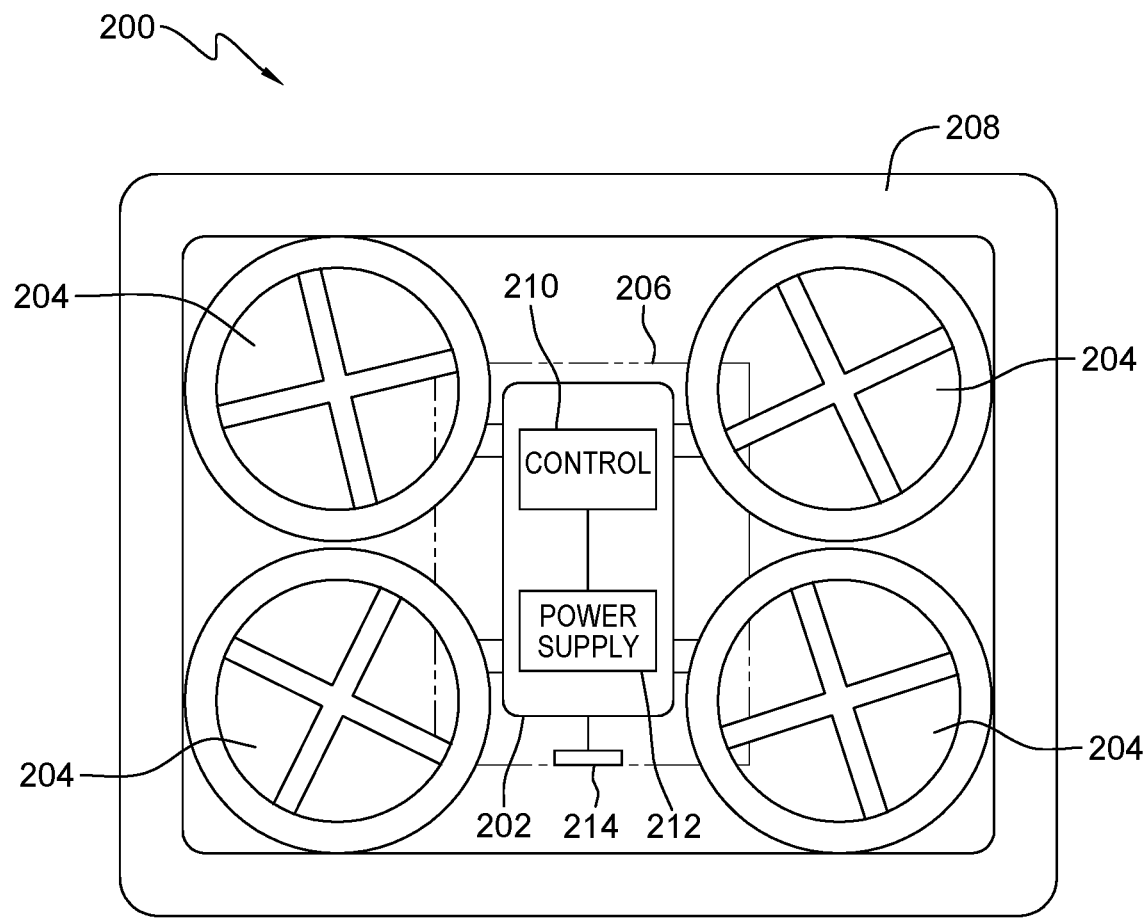
FIG. 2 is a plan view of one embodiment of a drone transport vehicle configured to transport one or more transport containers with integrated energy sources, in accordance with one or more aspects of the present invention.

FIG. 2 is a plan view of one embodiment of a transport vehicle 200, such as a battery-powered drone with energy sources tailored, and energy managed, in accordance with one or more aspects of present invention. In the depicted embodiment, transport vehicle 200 is a UAV-type drone, and includes a fuselage 202, rotors 204, payload compartment 206 to accommodate a transport container, and a frame 208. As shown, in the depicted embodiment, fuselage 202 is located in the central portion of transport vehicle 200, and can include (e.g., an interior compartment) a computing device or control 210, a transceiver (not shown), a power supply 212 (i.e., transport vehicle energy source, such as a battery) as well as an energy management system with energy transport line(s)/coupling(s) 214 for drawing energy from one or more integrated energy sources in one or more transport containers being delivered by the transport vehicle.

In one or more implementations, control 210 includes program code, or interfaces with program code, implementing data and predictive analyses as described herein. Additionally, control 210 can, for instance, facilitate control of transport vehicle 200, drop/release of transport containers, or performing one or more other tasks, including, power management to selectively draw power from one or more integrated energy sources within the transport container(s) being transported.

In the depicted embodiment, transport vehicle 200 includes four rotors 204 (e.g., transport vehicle 200 is a quad-copter) which are, for example, connected to the fuselage and spaced in pairs on opposing sides of fuselage 202 in a substantially rectangular configuration. As noted, it should be understood that transport vehicle 200 shown in FIG. 2 is one example only of a transport vehicle with which the concepts disclosed herein can be used and/or incorporated. Other suitable transport vehicles, such as other suitable drones, can have different propulsion systems and shapes (e.g., hexagonal, circular, etc.).

Although not shown in detail, each rotor 204 can include a propeller and an actuator (e.g., an electric motor) configured to cause the propeller to rotate in a manner suitable to create sufficient lift to cause the transport vehicle to fly. Further, in one or more embodiments, rotors 204 can be configured to rotate or tilt about one or more axes to enhance the flight and/or flight control of transport vehicle 200. One or more of rotors 204 can be configured such that the respective propeller is rotated in a clockwise direction (as viewed in FIG. 2), while others can be configured such that the propeller is rotated in a counter-clockwise direction. Alternatively, rotors 204 can be configured to selectively rotate the propellers in either the clockwise or counter-clockwise directions, depending on the need of the transport vehicle.

In the depicted embodiment, payload compartment (or payload mechanism) 206 is positioned below, and can be connected to, fuselage 202. Although not shown in detail, payload compartment 206 can be sized to receive any container suitable for transporting one or more products during the delivery process, and can include, for instance, at least one actuator configured to release the container(s) when transport vehicle 200 is at a delivery point, for instance, for later retrieval once the user has removed the product from the container. Although payload compartment 206 is shown to have a smaller overall size (at least viewed in FIG. 2), it should be understood that in one or more embodiments, payload compartment 206, or the transport container(s), can be configured to carry, or at least hold, products that have one or more dimensions (e.g., length) that is greater than the corresponding width of transport vehicle 200.

Note that in in or more implementations, the energy management system, including energy transport line(s)/coupling(s) 214, can include appropriate coupling mechanisms to readily couple the integrated energy source within one or more of the transport containers being delivered to the transport vehicle, and in particular, to the energy management system of the transport vehicle, to allow for selective use of energy drawn from the integrated energy source(s) within the container.

Note again that the electric unmanned aerial vehicle (UAV) example of FIGS. 1 & 2 is provided by way of example only. The concepts disclosed herein can be used in association with any transport vehicle, whether by land, air, or water. Note also that, although described herein in the context of an electric unmanned aerial vehicle, where the transport container might be relatively small in size, the concepts apply as well to large containers, such as large shipping and aircraft containers, discussed above.

Figure 3:
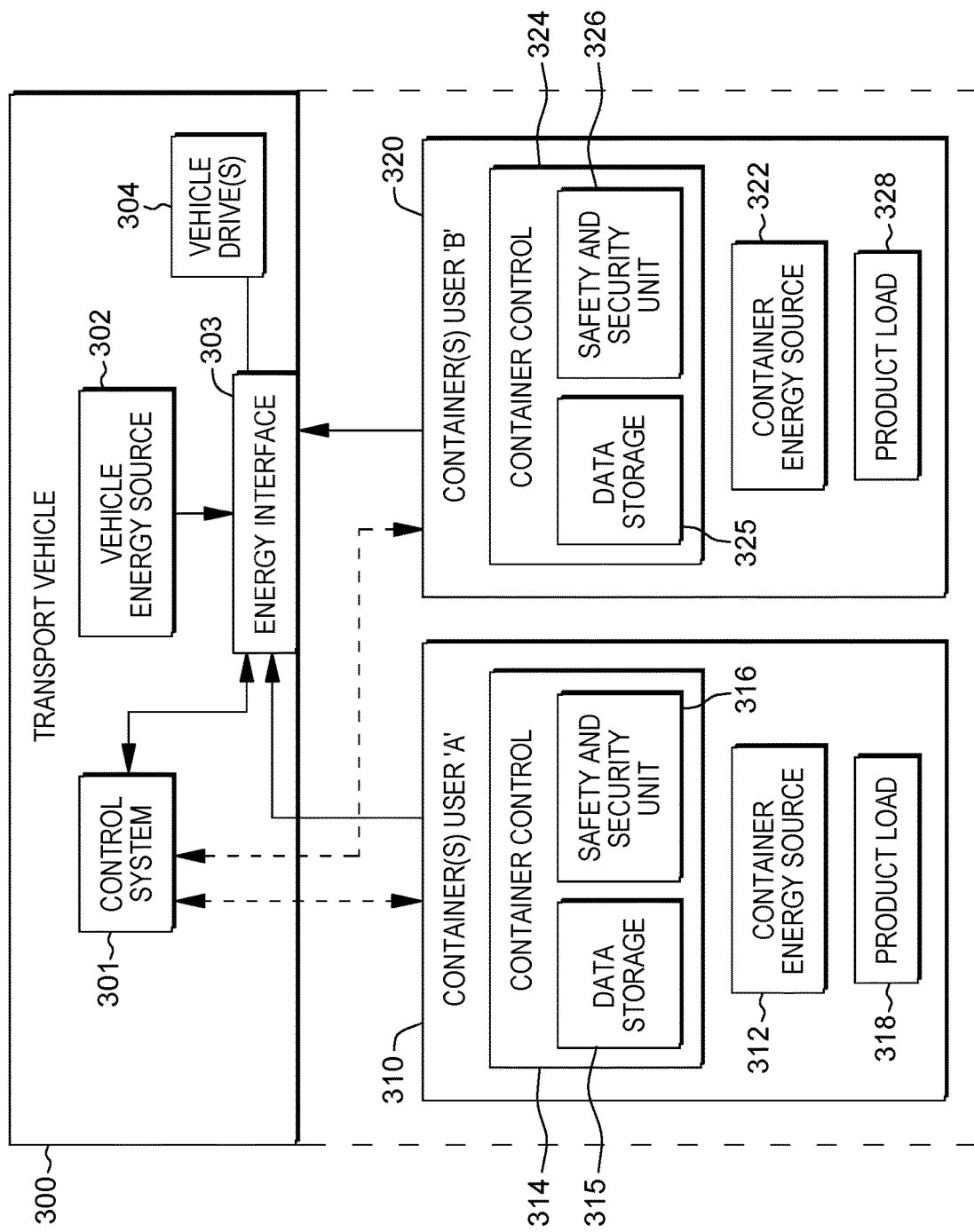
FIG. 3 is a schematic depiction of one embodiment of a transport vehicle to transport multiple transport containers, each with an integrated energy source, and illustrating certain aspects of an embodiment of the present invention.

FIG. 3 depicts a schematic of another embodiment of a transport vehicle 300 with a payload including a first transport container for user 'A' 310, and a second transport container 320 for user 'B'. Transport vehicle 300 can be, for instance, an unmanned aerial vehicle, such as described above in connection with FIG. 2, or a different type of transport vehicle, such as referenced herein. As illustrated, transport vehicle 300 can include a control or control system 301, a transport vehicle energy source 302, an energy management interface 303, and one or more vehicle drives 304. In operation, vehicle energy source 302 provides energy, e.g., via energy management interface 303, to power vehicle drive(s) 304 to move transport vehicle 300 along, for instance, a determined transport route for delivery of transport containers 310, 320 from a starting destination, to one or more delivery points, such as the respective user addresses.

In the embodiment depicted in FIG. 3, each transport container 310, 320 includes a respective integrated, container energy source 312, 322, the size of which is determined based on program code processing, such as described herein. In the embodiment depicted, each transport container 310, 320 further includes a container control 314, 324, each of which includes, for instance, data processing capability, as well as data storage 315 and a safety & security unit 316 to assist with safe transport and delivery of the respective product load 318, 328.

Those skilled in the art should note that in one or more embodiments, control system 301 and/or container controls 314, 324 include program code implementing one or more aspects of the processing described herein, including, for instance, obtaining data related to a planned transport event, analyzing the data to predict energy usage of the transport vehicle in performing the transport event, including transporting one or more transport containers, determining based at least in part on the predicted energy usage, an energy source size for integration or inclusion in a transport container of the one or more transport containers, and determining whether the transport vehicle is to proceed with the transport event of transporting the one or more transport containers. As discussed herein, determining whether to proceed is based, at least in part, on the program code or processor(s) determining that an energy source of the determined energy source size is integrated within the transport container, with the integrated energy source being adapted in the container to contribute energy to the transport vehicle when the container positioned within the transport vehicle for transport. In this manner, one or more aspects of the present invention disclosed herein advantageously provide additional power to the transport vehicle to, for instance, extend the travel range of the transport vehicle for a given product payload.

In one or more embodiments, when a transport container, such as transport container 310 or 320, is positioned within or on transport vehicle 300, the container energy source(s) is connected to the transport vehicle to allow energy to be drawn from the integrated container energy source(s) by the energy management interface 303 to assist with powering of the vehicle drive (s) 304. Depending on the type of energy source integrated within the transport container, an appropriate coupling mechanism (e.g., electric coupling or other renewable fuel coupling mechanism) is provided, connecting the integrated energy source of the container to the energy management interface 303 of transport vehicle 300 to allow for drawing of energy from the integrated energy source, as described herein.

Figure 4:
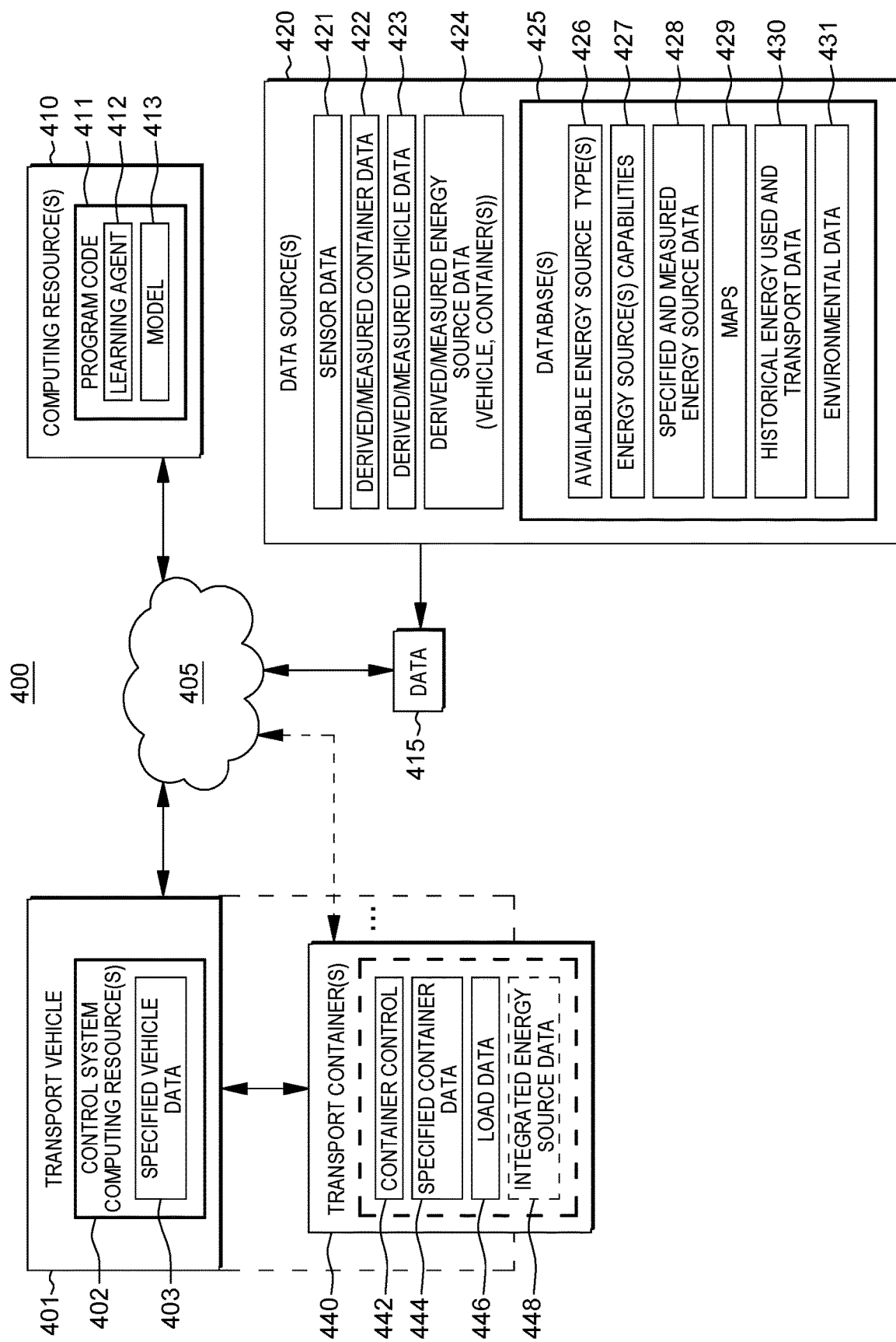
FIG. 4 depicts one embodiment of a system, illustrating certain aspects of an embodiment of the present invention.

FIG. 4 depicts a further embodiment of a technical environment or system 400 into which various aspects of some embodiments of the present invention can be implemented. System 400 includes, by way of example, one or more transport vehicles 401 which include control system computing resource(s) 402 that execute program code, such as disclosed herein. Additionally, one or more computing resources 410 can include program code 411 that generates or updates a model 413 based on machine learning, such as, via a cognitive learning agent 412, and that utilizes model 413 to predict energy usage of a transport vehicle in transporting one or more containers, as well as for use in selecting and sizing energy sources for integration into one or more of the containers for use by the transport vehicle during transport, as described herein. For illustrative purposes only, model 413 is depicted in FIG. 4 as being housed on separate computing resource(s) 410 from control system computing resource(s) 402 of transport vehicle 401. This is a non-limiting example of an implementation, as the learning agent program code 412, and/or model 413 could also be implemented, at least in part, in control system computing resource(s) 402 associated with transport vehicle 401. Likewise, in the illustrated implementation, program code 411 is shown including learning agent 412. However, various modules of program code 411 can be executed on varied resources in various embodiments of present invention, and thus, learning agent 412 and program code 411 can be separate modules, if desired.

By way of example only, system 400 includes, or utilizes, one or more networks 405 for, for instance, interfacing various aspects of computing resource(s) 410 with control system computing resource (s) 402 of transport vehicle 401, as well as for obtaining data 415 from one or more data sources 420, and, if desired, for directly interfacing with one or more transport containers, such as transport container 440 with container control 442. Note in this regard that computing resource(s) 410 can alternatively interface with container control 442 of container 440 through control system computing resource(s) 402 of transport vehicle 401. By way of example, network(s) 405 can be, for instance, a telecommunications network, a local area network (LAN), a wide area network (WAN), such as the Internet, or a combination thereof, and can include wired, wireless, fiberoptic connections, etc. The network(s) can include one or more wired and/or wireless networks that are capable of receiving and transmitting data, including data related to a product transport, data relating to an energy source size for inclusion in the container to be transported, and data associated with whether an energy source of determined energy source size has been integrated within the container, with the integrated energy source being adapted in the container to contribute energy to the transport vehicle when the container is positioned within the transport vehicle for transport, as described herein.

In certain embodiments of the present invention, program code 411 utilizes various data 415, such as data from data sources 420 including, for instance, sensor data 421, derived/measured container data 422, derived/measured vehicle data 423, and derived/measured energy source data 424, such as transport vehicle energy source data, and container energy source data. Note that, in one or more embodiments, sensor data can be obtained from various data sensors, including, for instance, data sensors associated with transport vehicle 401, transport container 440, and/or a variety of energy sources, one or more of which can be identified for integration into the transport container for use in supplying power to transport vehicle 401 during product transport. Data 415 can further be provided from one or more online sources and/or databases 425 including, for instance, available energy source types and sizes 426, energy source capabilities 427, specified and measured energy source data 428, maps and other transport route information 429, historical energy used and transport data 430, as well as environmental data 431 including, for instance, current weather conditions that might affect energy usage during transport. Additionally, in one or more embodiments, specified vehicle data 403 can be obtained from, for instance, control system computing resource(s) 402, and specified container data 444, load data 446, and integrated energy source data 448 can be obtained directly from transport container(s) 440 or from transport vehicle 401 via control system computing resource(s) 402. Note that the data, data sources, and databases illustrated in FIG. 4 are presented by way of example only, and that those skilled in the art will understand that other data sources, online resources, databases, etc., can be used in providing data to program code 411 for analysis and use in predicting energy usage of transport vehicle 401 in transporting one or more transport containers, including container 440 having an energy source integrated therein with size selected or tailored, as disclosed herein. Additional details of data which can be analyzed by the program code are discussed further below with reference to FIGS. 5-10D.

In one or more implementations, computing resource(s) 410 houses and/or executes program code 411 configured to perform methods in accordance with one or more aspects of the present invention. By way of example, computing resource(s) 410 can be a server or other computing-system-implemented resource(s) that is, in one or more embodiments, separate from transport vehicle 401, or have aspects thereof integrated, in whole or in part, into transport vehicle 401 and/or transport container 440. For illustrative purposes only, computing resource(s) 410 is depicted in FIG. 4 as being separate from transport vehicle 401 and transport container 440. This is a non-limiting example of an implementation. In one or more other implementations, computing resource(s) 410 on which program code 411 executes could, at least in part, be located within transport vehicle 401 and/or transport container 440. For instance, computing resource(s) 410 could be a central server or controller within transport vehicle 401. In one or more other implementations, computing resource(s) 410 could be or include cloud-based computing resources.

Briefly described, computing resource(s) 410 (as well as control system computing resource(s) 402 and/or container control 442) can include one or more processors, for instance, central processing units (CPUs). Also, the processor(s) can include functional components used in the integration of program code, such as functional components to fetch program code from locations such as cache or main memory, decode program code, and execute program code, access memory for instruction execution, and write results of the executed instructions or code. The processor(s) can also include a register(s) to be used by one or more of the functional components. In one or more embodiments, computing resource(s) 410 can include memory, input/output, a network interface, and storage, which can include and/or access one or more knowledge databases, such as databases 425 of data source(s) 420. The components of computing environment 410 can be coupled to each other via one or more buses and/or other connections. Bus connections can be one or more of any of several types of bus structures, including a memory bus or a memory controller, a peripheral bus, an accelerated graphics port, and a processor or local bus, using any of a variety of bus architectures. By way of example, and not limitation, such architectures can include the industry standard architecture (ISA), the micro-channel architecture (MCA), the enhanced ISA (EISA), the video electronic standard association (VESA), local bus, and peripheral component interconnect (PCI). Examples of the computing resource(s) or computer system(s) which can implement one or more aspects disclosed herein are described further below with reference to FIGS. 11-13. Note also that, depending on the implementation, one or more aspects of computing resource(s) 410 can be associated with, licensed by, subscribed to by, etc., a company or organization operating, owning, etc., transport vehicle 401 and/or transport container(s) 440.

Program code 411 executing on computing resource(s) 410 obtains data relating to the product transport and analyzes the data to predict energy usage of the transport vehicle in transporting the one or more containers during a transport event. As noted above, the data received can include a variety of types of data, and the data can be used by the learning agent 412 to continually learn (in one embodiment) and update the patterns that form model 413. In some embodiments, program code 411 executing on one or more computing resources 410 applies machine learning algorithms to generate and train model 413, which the program code 411 then utilizes to determine, for instance, an energy source size and type for inclusion in a container to be transported by the transport vehicle, as well as to determine whether the transport vehicle is to proceed with transporting of the one or more containers, for instance, based on determining that an energy source of the determined energy source size and type is integrated into the container, and adapted within the container to contribute energy to the transport vehicle with the container positioned within the transport vehicle for transport. In an initialization or learning stage, program code 411 trains the algorithm(s), based on patterns and available transport vehicle data and transport container data, as well as energy source data. As part of this, program code 411 can construct one or more relational data structures that map energy requirements, as well as energy source and energy types, to transport vehicles, transport containers, transport weight, as well as required transport distance. The relational data structures can be built or ascertained based on a body of knowledge obtained from a plurality of sources, such as described herein.

In one or more embodiments, a machine learning training system can be utilized to perform cognitive analysis of various inputs, including various data inputs such as described herein, as well as the body of knowledge. The training data utilized to train the model in embodiments of the present invention can include a variety of types of data, as described. The program code in embodiments of the present invention can perform a cognitive analysis to generate data structures, including algorithms utilized by the program code to provide, for instance, a recommended energy source size and type for inclusion in a container to be transported by a transport vehicle to ensure sufficient energy to perform a planned transport event. Machine learning (ML) solves problems that cannot be solved by numerical means alone. In a ML-based example, program code extracts various features/attributes from training data (e.g., data collected from a variety of data sources relevant to the transport vehicle(s), transport container(s), energy source(s), etc.), which can be resident in one or more places, including, within the transport vehicle, the transport container(s), and/or data sources, as discussed. The features are utilized to develop a predictor function, also referred to as a hypothesis, which the program code utilizes to train the machine learning model.

In identifying or predicting an energy source size and type for inclusion in a container, predicted energy usage by the transport vehicle is obtained from analyzing the available data. In identifying a recommendation for a particular energy source size and type, the program code can utilize various techniques to select features (elements, patterns, attributes, etc.) including, but not limited to, diffusion mapping, principal component analysis, recursive feature elimination (a brute force approach to selecting features), and/or a Random Forest, to predict the energy usage and, for instance, to determine an energy source size and type for inclusion in a transport container to be transported by the transport vehicle. The program code can utilize a machine learning algorithm to train the machine learning model (the algorithms utilized by the program code), including providing rankings or weights for extracted data for inclusion, so that the program code can train the predictor or recommendation functions to include in the machine learning model. The conclusions can be evaluated by a quality metric. By selecting an appropriate set of training data, the program code trains the machine learning model to identify and weight various attributes (e.g., features, patterns) that correlate (for example) transport routes, distances, container size and weight, transport vehicle type, weather conditions, etc., to predicted energy usage, and based thereon, to determining an energy source size and type for inclusion in a container to be transported by the transport vehicle.

The model 413 can be self-learning, as program code 411 updates model 413 based on feedback received during the transport operation, particularly at the learning phase. For example, when program code 411 determines that the transport vehicle is performing a new transport operation, program code 411 can utilize learning agent 412 to update model 413 to reflect the new transport, in order to improve future recommendations. In certain embodiments, program code 411 includes or utilizes learning model 412, which cognitively analyzes any new data deviating from model 413, and adjusts model 413 to improve the model moving forward.

In some embodiments of the present invention, program code 411 executing on one or more computing resources 410 utilizes existing cognitive analysis tools or agents to create, and tune, model 413, based, for instance, on data obtained from the various data sources. Some embodiments of the present invention can utilize IBM Watson® as learning agent 412 (i.e., as a cognitive agent). IBM Watson® is a registered trademark of International Business Machines Corporation, Armonk, N.Y., USA. In embodiments of the present invention, program code 411 interfaces with IBM Watson® application programming interfaces (APIs) to perform cognitive analysis of obtained data. In some embodiments of the present invention, program code 411 interfaces with the application programming interfaces (APIs) that are part of a known cognitive agent, such as the IBM Watson® application program interface (API), a product of International Business Machines Corporation, to determine impacts of data on the model and to update the model, accordingly.

In some embodiments of the present invention, certain of the APIs of the IBM Watson® API include a cognitive agent (e.g., learning agent) that includes one or more programs, including, but not limited to, natural language classifiers, Retrieve and Rank (i.e., a service available through the IBM Watson® developer cloud that can surface the most relevant information from a collection of documents), concepts/visualization insights, tradeoff analytics, document conversion, natural language processing, and/or relationship extraction. In an embodiment of the present invention, one or more programs can be provided to analyze data obtained by program code 411 across various sources utilizing one or more of a natural language classifier, Retrieve and Rank APIs, and tradeoff analytics APIs. In operation, the program code 411 can provide predictions or recommendations for a given transport vehicle and transport event.

In some embodiments of the present invention, program code 411 utilizes a neural network to analyze collected data relative to a user to generate model 413, for use in predicting energy usage, and determine an energy source size and type for inclusion in a particular container to be transported by a transport vehicle. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision making tools). In general, program code 411 utilizing neural networks can model complex relationships between inputs and outputs and identify patterns in data. Because of the speed and efficiency of neural networks, especially when parsing multiple complex data sets, neural networks and deep learning provide solutions to many problems in multi-source processing, which the program code 411, in embodiments of the present invention, can accomplish when obtaining data and building a model for providing predicted energy usage, and determining an energy source size and type for integration into a container to be transported by a transport vehicle.

Figure 5:
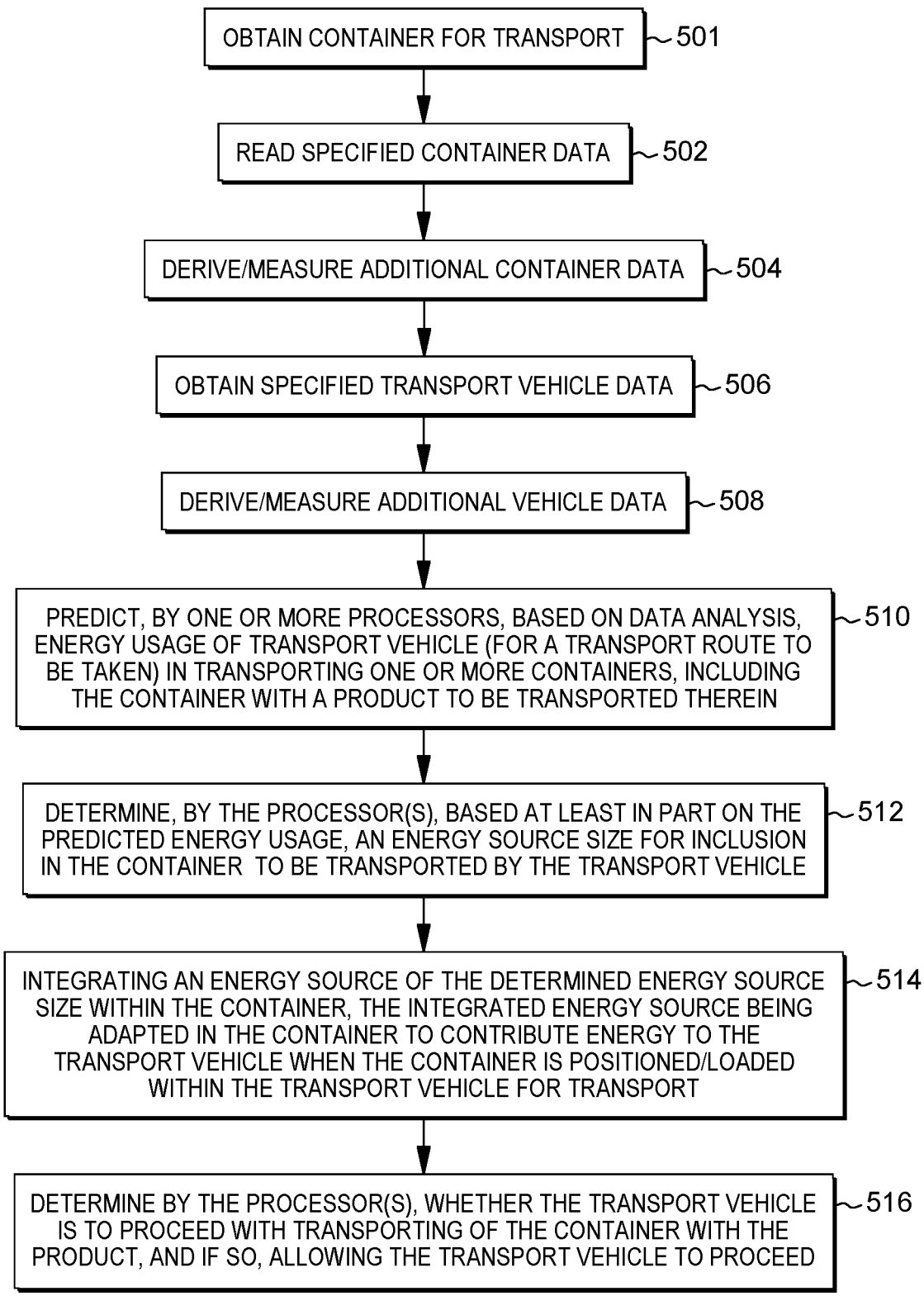
FIG. 5 depicts a workflow illustrating certain aspects of an embodiment of the present invention.

FIG. 5 depicts one embodiment of processing or workflow in accordance with one or more aspects of the present invention. In this embodiment, a container is obtained, presented, or identified for transport 501, and indicated data is read by the program code, such as specified container data 502. Program code derives and/or measures additional data, such as the weight of the transport container, origin, destination, instructions, etc., 504, obtains specified transport vehicle data 506, such as identifying vehicle data, and derives and/or measures any additional vehicle data 508, such as actual weight of the vehicle and/or cargo, planned transport route, actual transport route, weather conditions, etc. In some embodiments of the present invention, the program code predicts, based on data analysis, energy usage of the transport vehicle for a transport route to be taken in transporting one or more transport containers, including at least one transport container with a product to be transported therein 510. Program code determines, based at least in part on the predicted energy usage, an energy source size and/or type for inclusion in the container to be transported by the transport vehicle 512. Program code confirms integration of an energy source of the determined energy source size within the container, with the integrated energy source being adapted in the container to contribute energy to the transport vehicle when the container is positioned or loaded within the transport vehicle for transport 514. The program code then determines whether the transport vehicle is to proceed with transporting of the container with the product (e.g., determines whether there is sufficient energy available based on predicted energy usage), and if so, allows the transport vehicle to proceed 516.

Figure 6:
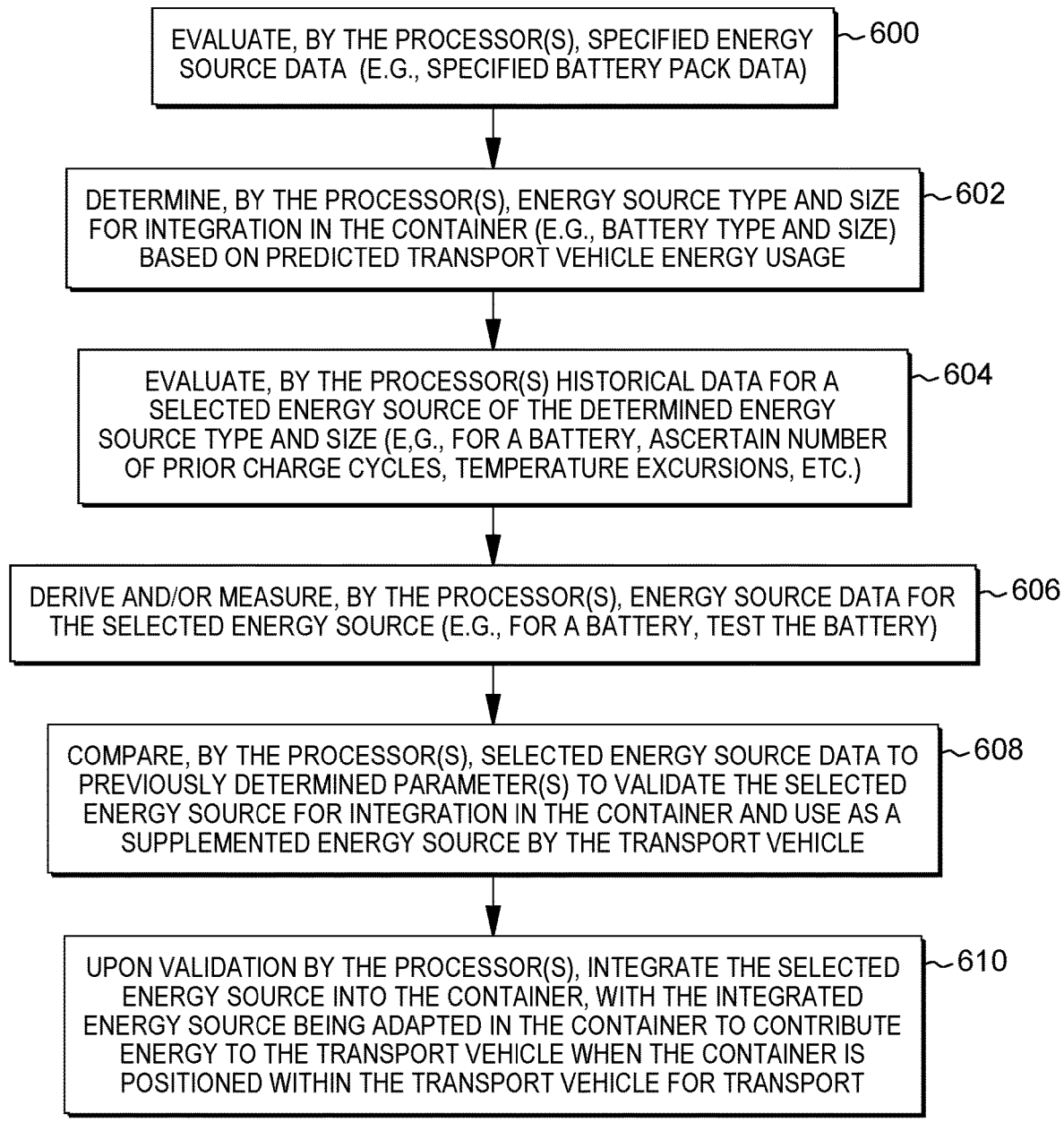
FIG. 6 depicts a further workflow illustrating certain aspects of an embodiment of the present invention.

FIG. 6 depicts one embodiment of a workflow or process for evaluating and integrating a particular energy source into a transport container for use during a planned transport event. As illustrated, program code evaluates specified energy source data, such as specified battery pack data 600, and determines an appropriate energy source type and size for integration into a transport container based, at least in part, on the predicted transport vehicle energy usage, as well as, for instance, on whether one or more other transport containers also include integrated energy sources that will contribute energy during the transport event 602. Program code further evaluates historical data for a selected energy source of the determined energy source type and size 604. For instance, for a particular battery selected for integration into a transport container, program code evaluates the number of prior charge cycles, any temperature excursions, charge capacity, etc., of the particular battery being integrated into the container for use during the transport event. Further, in one or more embodiments, program code derives and/or measures energy source data for the selected energy source 606. For instance, for a selected battery to be integrated into the transport container, the battery can be tested and the results analyzed prior to integration of the battery into the transport container for use during the transport event. In one or more embodiments, program code compares the selected energy source data to previously determined parameters to validate the selected energy source for integration into the container and use as a supplemental energy source by the transport vehicle 608. For instance, a go, no-go parameter can be predetermined by comparison of derived, measured and/or tested battery parameters with stated, indicated and/or historical data for the battery. Upon validation by the program code, the selected energy source can be integrated into the transport container, or confirmed to be integrated within the transport container, with the integrated energy source being adapted in the container to contribute energy to the transport vehicle when the container is positioned or loaded within the transport vehicle for the transport event 610.

Note that, although referred to herein as being integrated into the container, those skilled in the art will note that the energy sources can, in one or more embodiments, be permanently fixed within the container as part of the container, and be refillable or rechargeable as needed to ensure that an energy source of appropriate "size" is integrated within the container. Further, different containers can be provided with differently sized energy sources provided within the containers. In this manner, the "size" of the energy source can be selected for integration by selecting the particular container with the desired energy source integrated therein. Further, note that the energy sources integrated within the containers are provided in a manner to be rechargeable and/or refillable, depending upon the energy source type.

As described herein, the vast majority of product or cargo is shipped in a variety of physical containers, referred to herein as transport containers. Depending on the transportation mode, the transport containers typically have one or more predetermined sizes and/or configurations, with standardized outside dimensions and predetermined stacking loads. In accordance with one or more aspects disclosed herein, one or more of the transport containers for a transport event are modified, for instance, retrofitted, with one or more energy sources selected, in part, based on the predicted energy usage of the transport vehicle. In one or more embodiments, the transport container's owner, user, steward, etc., can benefit from this approach, although the user themselves do not need to provide the energy source. Further, by integrating the energy source, for instance, within one or more walls, floor, cover of the transport container, there is a very small decrease in storage capacity. In one or more implementations, energy provision can be brokered between a transporter and user, where the transporter might be short of energy for a planned transport event, and a contract can be made with the user of a transport container who can provide an additional energy source(s), as described herein. In one or more implementations, a transporter can incentive its shipping users, financially or otherwise, to add energy sources to their transport containers, event if not needed for a particular transport event. Further, note that one or more of the various data transfers described herein, such as, from the transport container to a central server with program code performing processing as described, can be instantiated on blockchain. Further, the supplemental energy source integration concepts described herein can be used on fully autonomous vehicles, as well as vehicles which use a spectrum of human input.

Figure 7A:
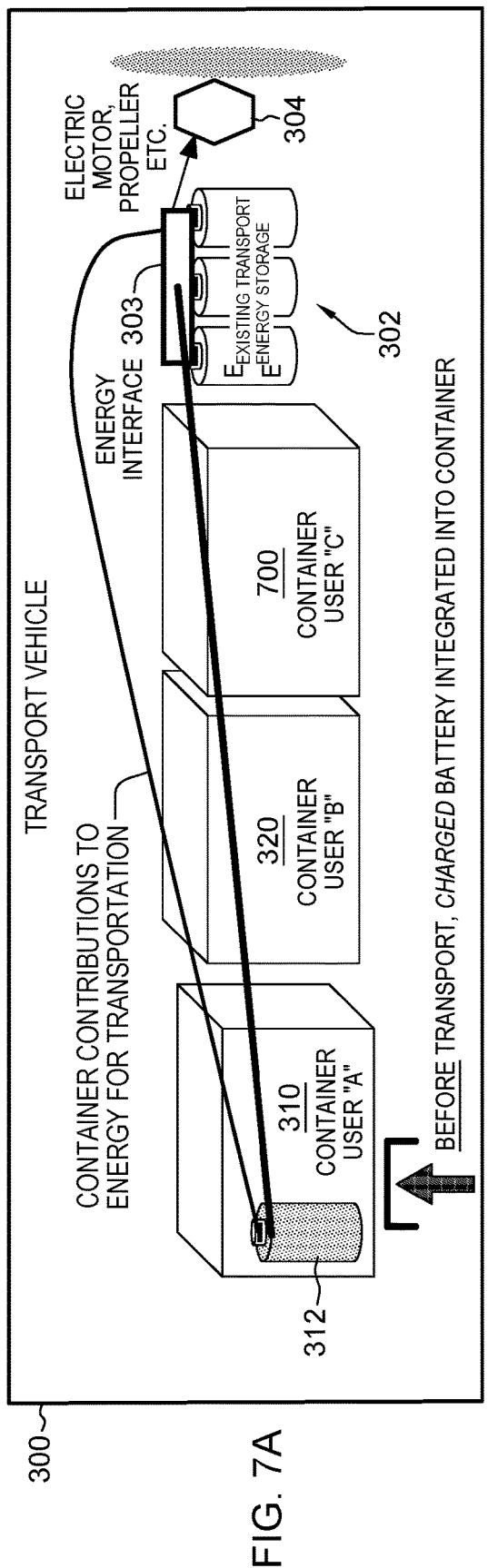
FIGS. 7A & 7B depict an embodiment of a system using container-based supplemental energy sources, and illustrating certain aspects of an embodiment of the present invention.
Figure 7B:
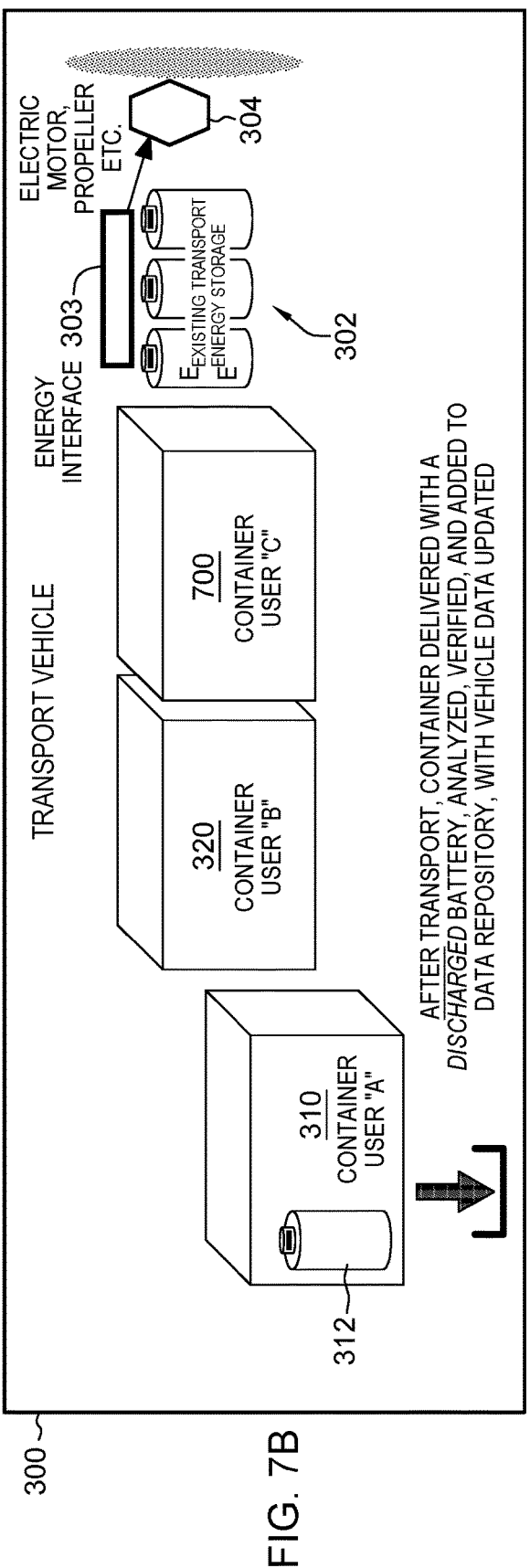

FIGS. 7A & 7B depict one embodiment of the use of a supplemental energy source within a transport container, as described herein.

In FIG. 7A, a transport vehicle 300 includes existing transport energy storage 302, and an energy management interface 303, which provides energy to a vehicle drive 304, such as an electric motor, propeller, etc. In this case, multiple transport containers, i.e., transport containers 310, 320 & 700, are illustrated, each from a different user. In FIG. 7A, transport container 310 is shown to include an integrated energy source 312, such as an integrated battery that has been selected and sized, as described herein. Prior to transport, the integrated battery is charged within the transport container, or charged prior to integration within the transport container. During the transport event, transport vehicle 300 draws energy from the integrated energy source 312 within transport container 310 as needed or desired for the transport event.

In FIG. 7B, the transport event has been completed, at least in part, with transport container 310 being unloaded, for instance, for reuse after unloading of the product within the container. In one or more embodiments, energy source 312 integrated within container 310 can be discharged at container delivery, with the energy source being analyzed, verified and the resultant data added to the data depository or database by the system program code, along with updating saved vehicle data related to the transport event.

Those skilled in the art will note from the description provided herein that a system is provided to extend the transport range of a transport vehicle. The system includes program code for managing available energy to extend the transport range in an environmentally sound manner, using transport containers to provide supplemental energy sources to power an electric or other ecologically suitable drive mechanism. Disclosed is a comprehensive range extension and energy optimization for transport vehicles, with one or more users of a transport vehicle optionally providing energy to the vehicle to perform the transport event. A system is provided for dynamically holding data to track transport containers, and energy or power distribution, with data being exchanged, for instance, in one or more secure communications, such as blockchain blocks, or by other mechanisms.

Figure 8:
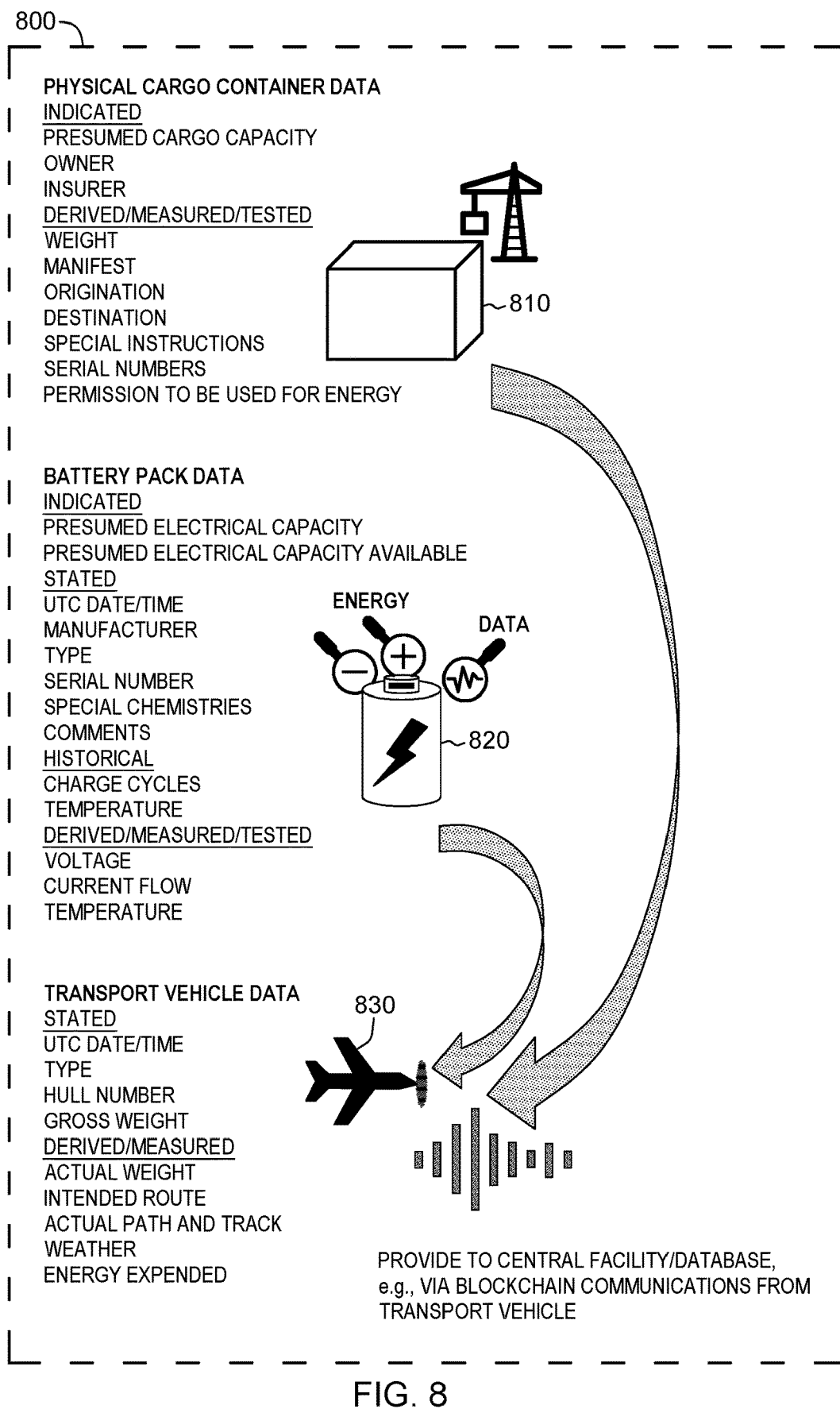
FIG. 8 depicts a further embodiment of a system illustrating certain aspects of an embodiment of the present invention.

FIG. 8 depicts a further embodiment of the data which can be tracked and/or monitored by program code to implement energy source management 800, in accordance with one or more aspects of the present invention. In FIG. 8, a transport container 810 is provided for transport, with the container being adapted to include one or more energy sources integrated therein, for instance, in one or more walls of the container. Physical cargo container data can be indicated, such as presumed cargo capacity, the owner of the cargo, insurer, etc., and derived, measured, and/or tested data can also be ascertained, including, for instance the weight of the transport container with cargo, the manifest, origin, destination, special transport instructions, serial numbers, permission to use integrated energy sources for supplemental energy during transport, etc. Further, energy source 820 data, such as battery pack data, can also be obtained by the program code for evaluation, as described. In the case of a battery pack, indicated data can include presumed electrical capacity, presumed electrical capacity available, stated data, such as UTC date/time, manufacturer, type, serial number, special chemistry, comments on energy source, historical data, such as number of charge cycles, any temperature deviations, as well as derived, measured, or tested data, such as available voltage, current flow capacity, temperature, etc. Obtained and evaluated transport vehicle 830 data can include stated data, such as UTC date/time, vehicle type, haul number, gross weight of vehicle, and gross weight capability, etc., as well as derived or measured data, such as actual weight of transport vehicle with cargo, intended transport route, actual path and transport route taken, current weather conditions, energy expendage, etc. The data can be provided to a central facility or database via, for instance, secure communications (such as in a blockchain) from the transport vehicle, container and/or battery pack.

Figure 9A:
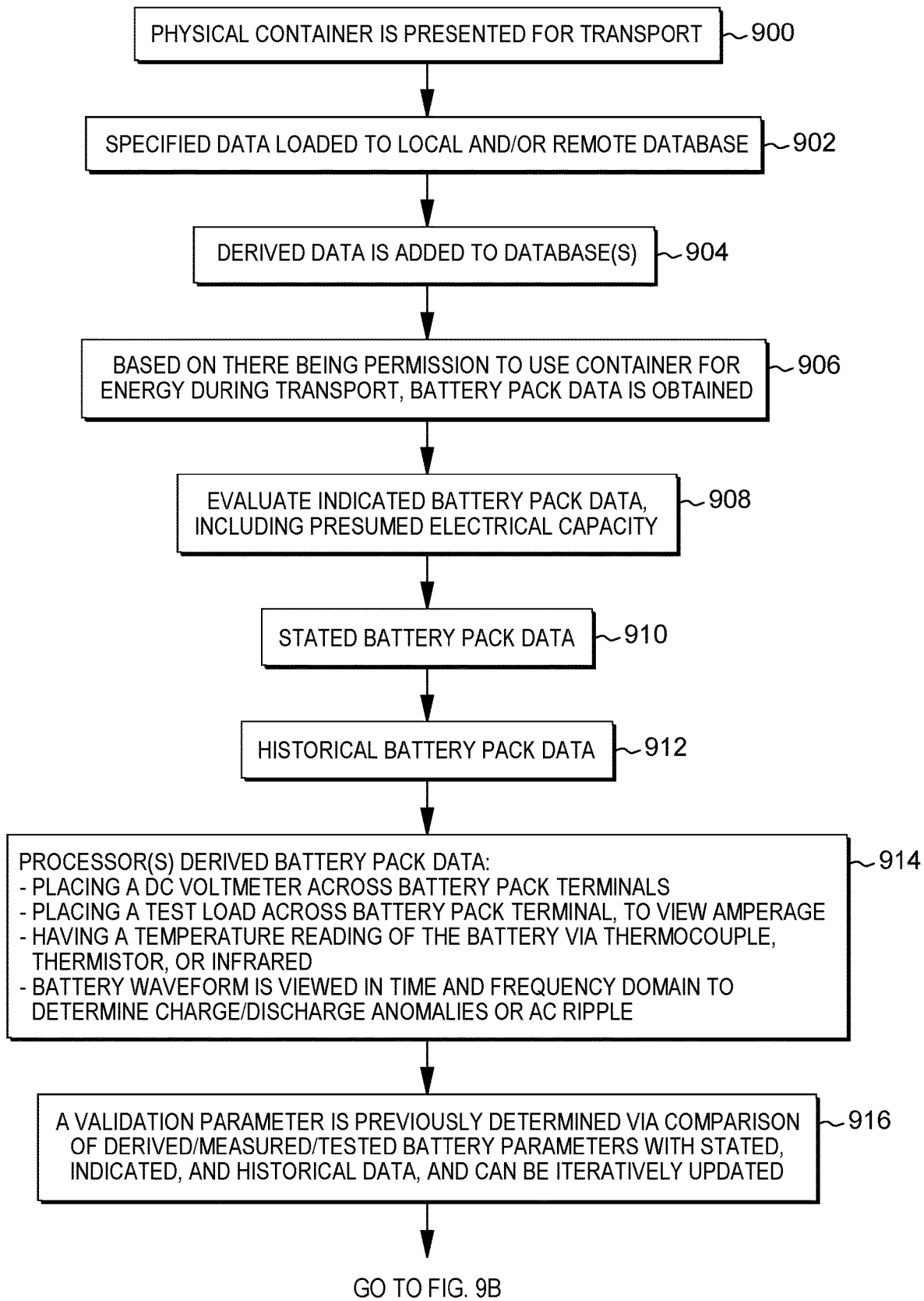
FIGS. 9A & 9B depict a further workflow illustrating certain aspects of an embodiment of the present invention.
Figure 9B:
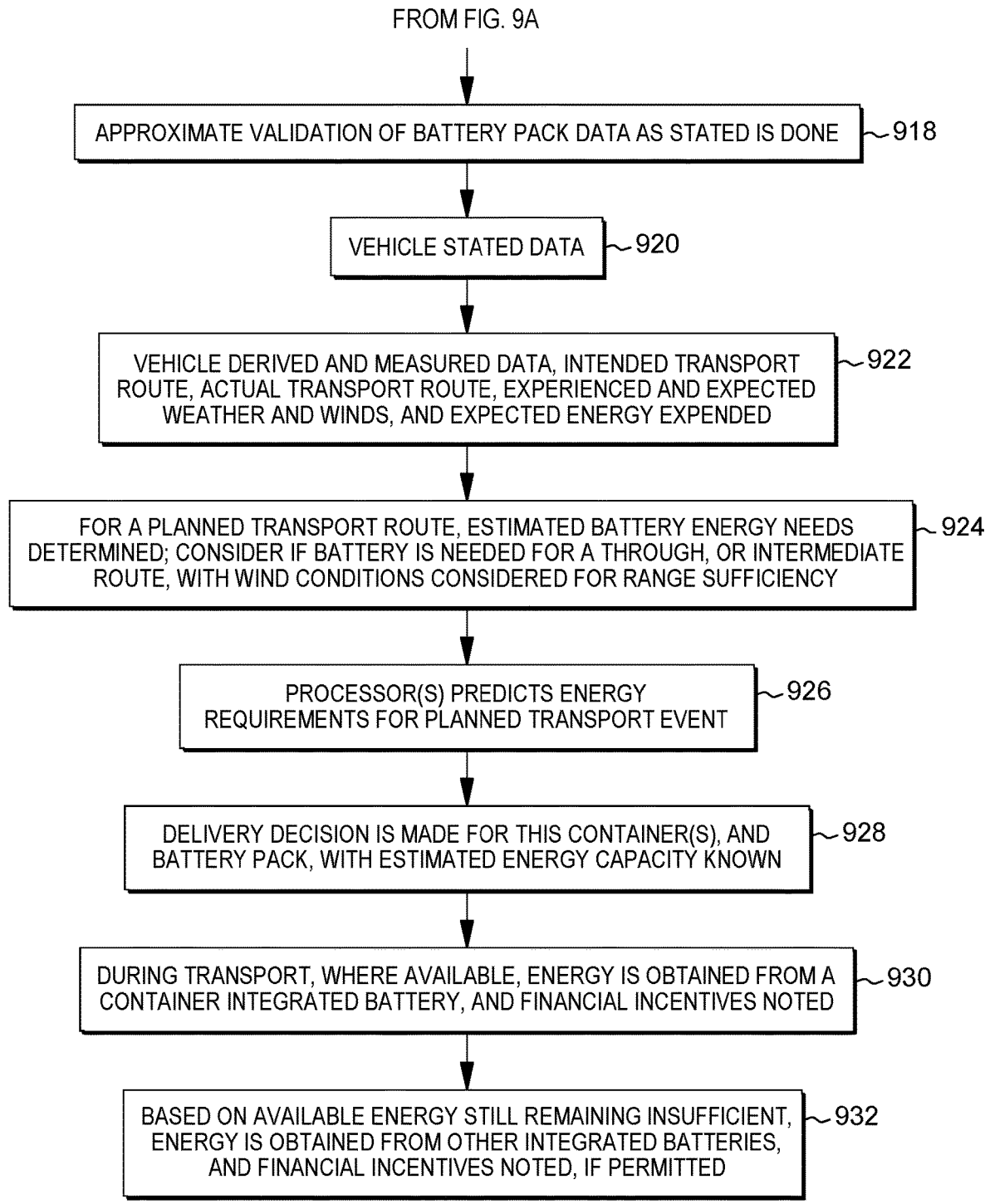

FIGS. 9A & 9B depict a further embodiment of processing or workflow, in accordance with one or more aspects of the present invention.

Referring to FIG. 9A, a physical container is presented, obtained, noted, etc., for transport 900, and specified or indicated data is loaded to a local and/or remote database for access by the program code 902. For instance, the specified data can include presumed cargo capacity, user, insurer, etc. Any derived data can also be added to the database 904, such as weight, manifest, origin, destination, special shipping instructions, serial numbers, permission to use integrated energy sources, etc. Based on there being permission to use the transport container for energy during transport, energy source data is obtained by the program code, such as battery pack data 906. As described herein, battery or battery packs are discussed as one example only of an ecologically sound energy source that can be integrated within the transport container for use by the transport vehicle during transport. In the case of an integrated battery, the indicated battery pack data is evaluated by the program code, including any presumed electrical capacity 908. Stated battery pack data is ascertained, which can include, for instance, current UTC or local date and time, manufacturer data, serial number data, special chemical, thermal, or other properties of the battery, and any user or shipper comments 910. Further, historical battery pack data can be obtained and evaluated 912, including quantities of prior charge cycles, and any temperature excursions of the battery during transport or use.

In the embodiment illustrated, program code, or one or more processors, derive battery pack data, which can include, applying a DC test load across the battery pack terminal to view amperage, obtaining a temperature reading of the battery via a thermal couple, thermistor, or infrared reading, evaluating battery waveform(s) in time and frequency domains to determine charge/discharge anomalies or AC ripple, etc., 914.

In one or more embodiments, a validation parameter is predetermined for comparison by the program code of derived, measured and/or tested battery parameters with stated, indicated, and/or historical data 916. In one embodiment, the predetermined validation parameter(s) can be a total energy available exceeding the predicted energy usage for the transport event by a specified percent, which can be iteratively updated as a result of use of integrated energy sources over time for different transport events.

Referring to FIG. 9B, program code validates, or performs an approximate validation of, the battery pack data 918, and obtains for evaluation vehicle stated data 920, including, for instance, UTC, date/time, type, haul number, gross weight, etc. Vehicle-derived and measured data is obtained by the program code, such as intended transport route, actual transport route, experienced and expected weather and/or wind conditions, expected energy expenditures, etc. 922. For a planned transport route, predicted energy usage, such as estimated battery energy needs, is determined by the program code, including considering whether a supplemental energy source or battery is needed for a through or intermediate transport route, with wind conditions potentially being considered to ensure range sufficiency (in the case of a drone or other aircraft) 924. Program code determines the energy requirements for the planned transport event 926, and delivers a decision for this transport container(s) and available energy, with estimated energy capacity known, whether the transport event is to be proceed 928. Assuming that the event is to proceed, then during transport, where available, energy can be obtained from the transport container with the integrated battery, and if desired, financial incentives can be noted for the provider of the transport container energy 930. Based on the available energy still remaining insufficient, additional energy can be obtained from one or more other integrated energy sources, such as one or more other integrated batteries, in one or more other transport containers being transported by the transport vehicle, again, with financial incentives noted if desired 932.

FIGS. 10A-10D depict a further embodiment of program code processing, in accordance with one or more aspects of the present invention.

Figure 10A:
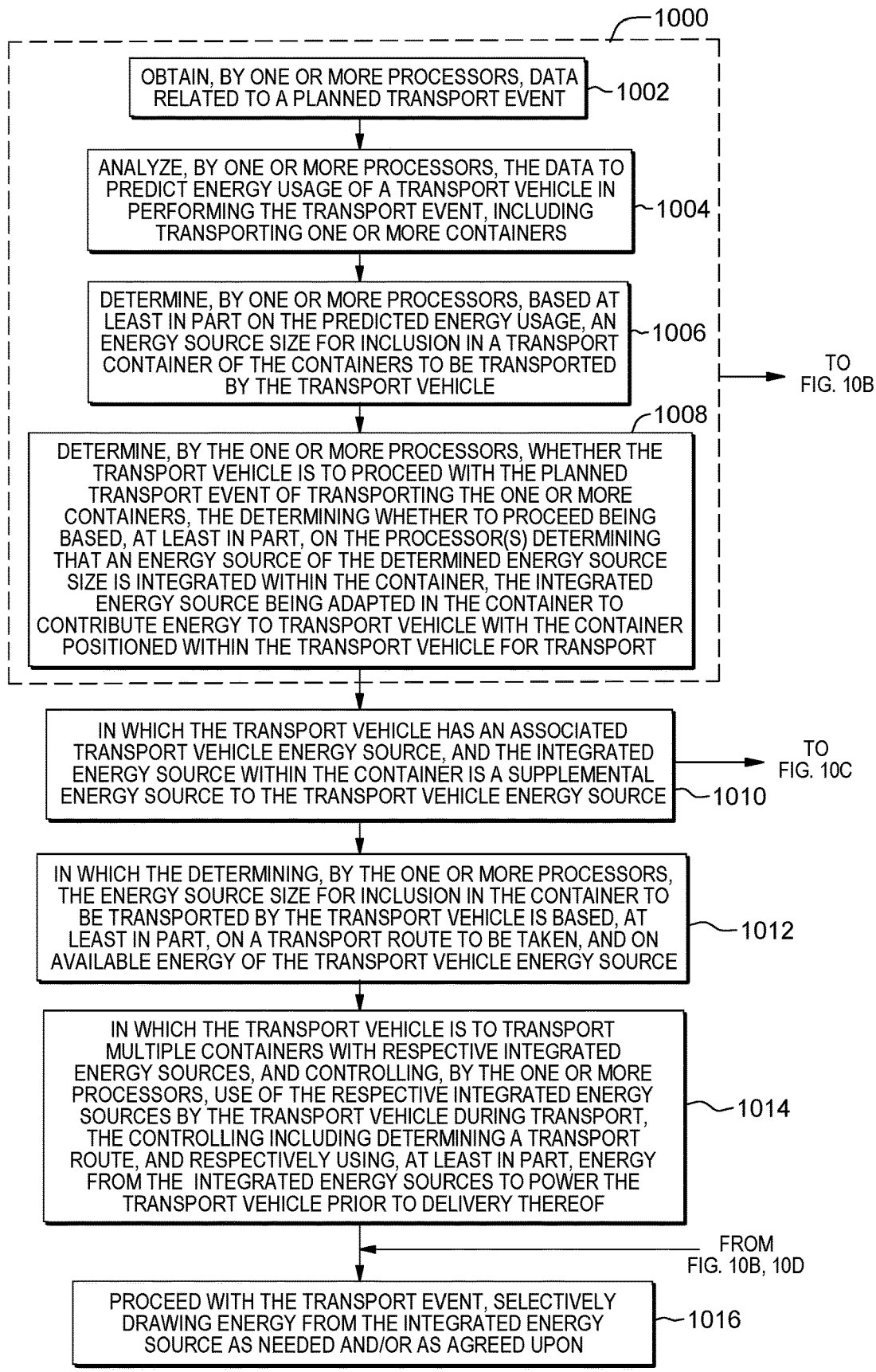
FIGS. 10A-10D depict another workflow illustrating certain aspects of an embodiment of the present invention.

As illustrated in FIG. 10A, program code can implement a process 1000 which includes obtaining, by one or more processors, data related to a planned transport event 1002, and analyzing, by the one or more processors, the data to predict energy usage of a transport vehicle in performing the transport event, including transporting one or more transport containers 1004. The one or more processors further determine, based at least in part on the predicted energy usage, an energy source size for a transport container of the containers to be transported by the transport vehicle 1006, and determine whether the transport vehicle is to proceed with the planned transport event of transporting the one or more containers 1008. The determining whether to proceed can be based, at least in part, on the processor determining that an energy source of the determined energy source size is integrated within the container, and that the integrated energy source is adapted in the container to contribute energy to the transport vehicle with the container positioned within the transport vehicle for transport.

As illustrated in FIG. 10A, in some embodiments, the transport vehicle has an associated transport vehicle energy source, and the integrated energy source within the container is a supplemental energy source to the transport vehicle energy source 1010. Further, determining, by the one or more processors, the energy source size for inclusion in the container to be transported by the transport vehicle can be based, at least in part, on a transport route to be taken, and on the available energy of the transport vehicle energy source 1012. In one or more embodiments, the transport vehicle is to transport multiple containers with respective integrated energy sources, and the process includes controlling, by the one or more processors, use of the respective integrated energy sources by the transport vehicle during transport 1014. The controlling can include determining a transport route, and respectively using, at least in part, energy from the integrated energy sources to power the transport vehicle prior to delivery thereof. In one or more embodiments, the one or more processors authorize proceeding with the transport event, and selective drawing of energy from the integrated energy source as needed and/or as agreed upon by the parties 1016.

Figure 10B:
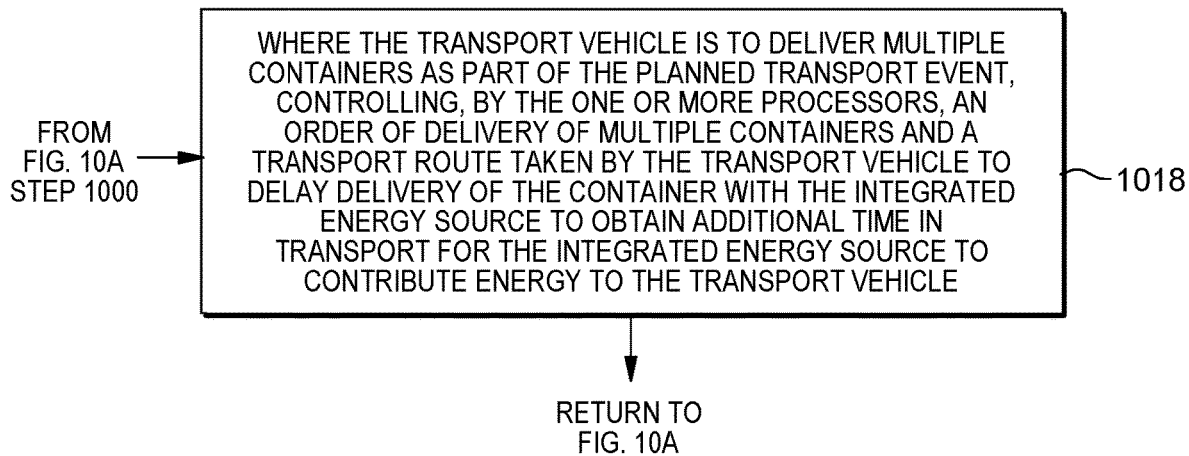

As illustrated in FIG. 10B, in one embodiment, from process 1000, where the transport vehicle is to deliver multiple containers as part of the planned transport event, the process can include controlling, by the one or more processors, an order of delivery of the multiple containers, and a transport route taken by the transport vehicle to delay delivery of the container with the integrated energy source to obtain additional time in transport for the integrated energy source to contribute energy to the transport vehicle 1018.

Figure 10C:
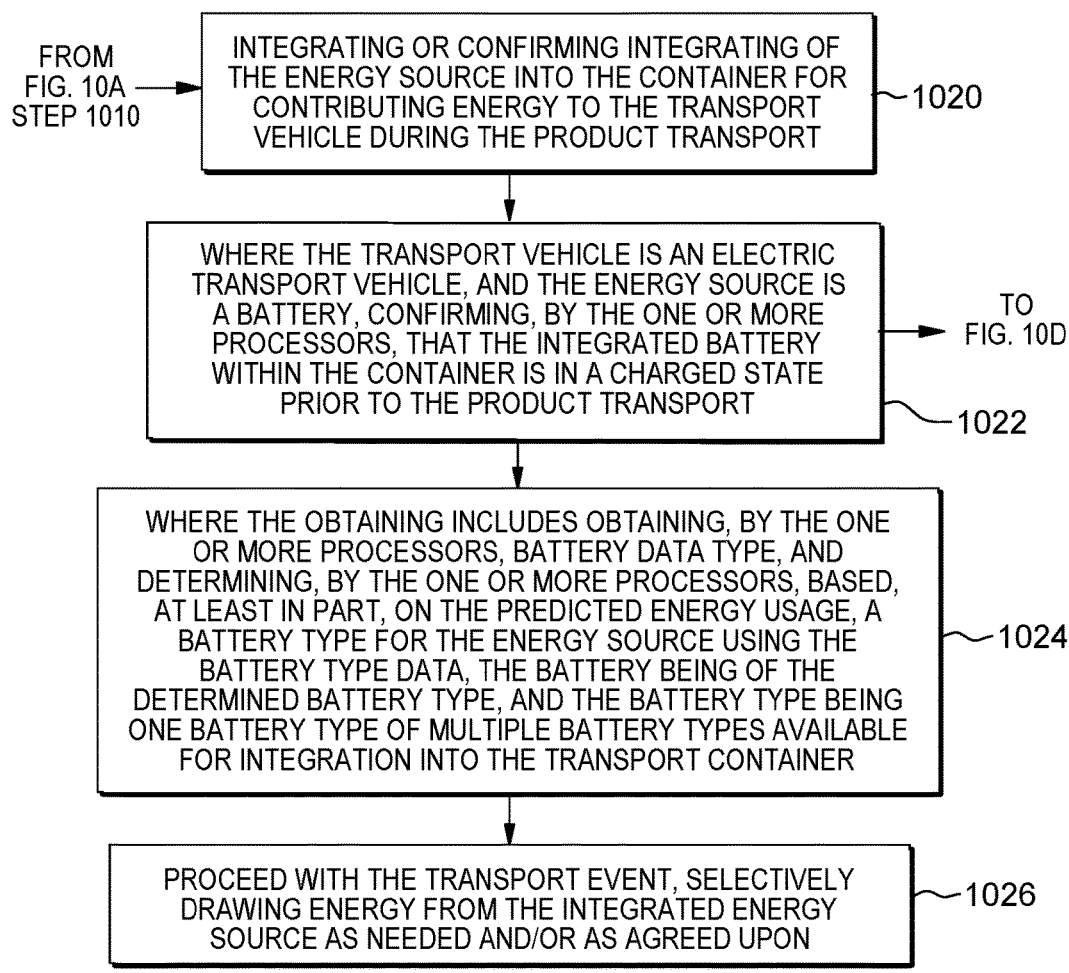

As illustrated in FIG. 10C, in one or more implementations, the one or more processors can confirm integrating of the energy source into the container for contributing energy to the transport vehicle during product transport 1020, and where the transport vehicle is an electric transport vehicle, and the energy source is a battery, can confirm that the integrated battery within the container is in a charged state prior to the product transport 1022. In one or more implementations, where the obtaining includes obtaining, by the one or more processors, battery data type, the process includes determining, by the one or more processors, based at least in part, on the predicted energy usage, a battery type for the energy source using the battery type data 1024, where the battery type is one battery type of multiple possible battery types available for integration into the transport container. In one embodiment, the program code authorizes proceeding with the transport event, and the selective drawing of energy from the integrated energy source as needed, and/or as agreed upon 1026.

Figure 10D:
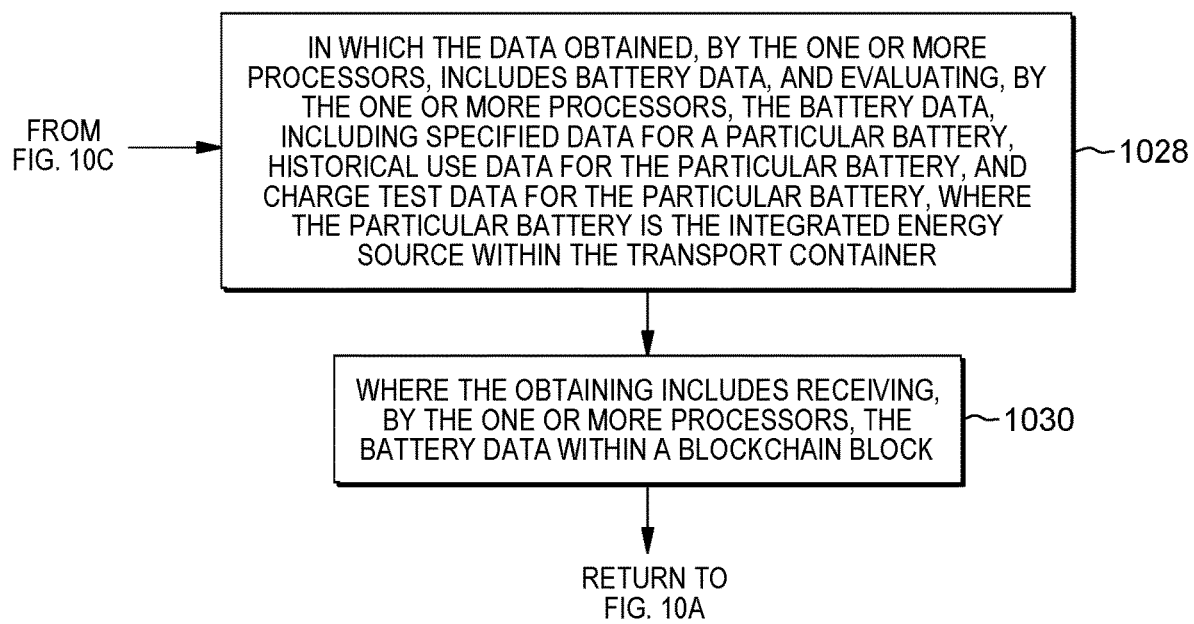

As shown in FIG. 10D, in one or more implementations, where the transport vehicle is an electric transport vehicle, and the energy source is a battery, the data obtained by the one or more processors can include battery data, and the process can include evaluating, by the one or more processors, the battery data, including specified data for the particular battery, historical use data for the particular battery, and charge test data for the particular battery 1028. In one implementation, the particular battery is the integrated energy source within the transport container to be transported by the transport vehicle. Further, in one or more embodiments, the obtaining of data can include receiving, by the one or more processors, the battery data within a blockchain block 1030.

Those skilled in the art will note from the above description that many variations are possible for more embodiments of the concepts disclosed herein. Advantageously, disclosed are mechanisms and systems for dynamically receiving and processing data to, for instance, track transport containers, as well as energy or power distribution within a transport vehicle and the container-based energy sources, as described. In one or more implementations, blockchain or other secure communications can be used to transfer data between components. Further, methods for managing energy in a comprehensive system are disclosed herein.

In one or more embodiments, a method and system for transport container contribution to energy storage and efficiency of a transport vehicle are disclosed, including for drones and other cargo vehicles, such as an electric vehicle. In one or more embodiments, one or more batteries in one or more transport containers to be transported are used, with the process including determining, by a control system, a container type and battery type for a particular cargo or product load being transported using an electrically-powered transport vehicle, such as a long-haul truck, drone, aircraft, etc. Program code determines battery usage and battery storage capacity for the vehicle for a particular transport route, and determines a battery type and size to be included in the container, with the battery being adapted within the container to contribute to the energy storage and energy use of the transport vehicle. The battery is provided or integrated within the transport container based on the determined battery type and size, with the battery being in a charged condition as incorporated (in one embodiment) for contributing to the energy storage and use of the transport vehicle. In one or more implementations, upon the retrieval of a previously used transport container, the container with the integrated battery in the depleted state, can be recharged for another transport event.

Further exemplary embodiments of a computing environment to implement one or more aspects of the present invention are described below with reference to FIGS. 11-13.

By way of further example, FIG. 11 depicts one embodiment of a computing environment 1100, which includes a computing system 1112. Examples of well-known computing systems, environments, and/or configurations that may be suitable for use with computer system 1112 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1112 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 11, computing system 1112, is shown in the form of a general-purpose computing device. The components of computing system 1112 can include, but are not limited to, one or more processors or processing units 1116, a system memory 1123, and a bus 1118 that couples various system components including system memory 1123 to processor 1116.

In one embodiment, processor 1116 may be based on the z/Architecture® offered by International Business Machines Corporation, or other architectures offered by International Business Machines Corporation or other companies.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1112 can include a variety of computer system readable media. Such media may be any available media that is accessible by computing system 1112, and it includes both volatile and non-volatile media, removable and non-removable media.

System memory 1123 can include computer system readable media in the form of volatile memory, such as random access memory (RAM) 1130 and/or cache memory 1132. Computing system 1112 can further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1118 by one or more data media interfaces. As described below, memory 1123 can include at least one program product having a set (e.g., at least one) of program modules or code that are configured to carry out the functions of embodiments of the invention.

Program/utility 1140, having a set (at least one) of program modules 1142, can be stored in memory 1132 by way of example, and not limitation, as well as an operating system, one or more application programs, other program modules, and program data. Each of the operating system, one or more application programs, other program modules, and program data or some combination thereof, can include an implementation of a networking environment. Program modules 1142 generally carry out the functions and/or methodologies of embodiments of the invention as described herein. Alternatively, an energy source and transport processing facility, module, logic, etc., 1101 can be provided within computing environment 1112 implementing positive/negative facet analysis processing, as disclosed herein.

Computing system 1112 can also communicate with one or more external devices 1114 such as a keyboard, a pointing device, a display 1124, etc.; one or more devices that enable a user to interact with computing system 1112; and/or any devices (e.g., network card, modem, etc.) that enable computing system 1112 to communicate with one or more other computing devices. Such communication can occur via Input/Output (I/O) interfaces 1122. Still yet, computing system 1112 can communicate with one or more networks such as a local area network (LAN), a general wide area network (WAN), and/or a public network (e.g., the Internet) via network adapter 1120. As depicted, network adapter 1120 communicates with the other components of computing system, 1112, via bus 1118. It should be understood that although not shown, other hardware and/or software components could be used in conjunction with computing system 1112. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 11. Computer system/server 1112 of FIG. 11 can be practiced in distributed cloud computing environments where tasks are performed by remote processing devices that are linked through a communications network. In a distributed cloud computing environment, program modules may be located in both local and remote computer system storage media including memory storage devices. Computer system/server 1112 is capable of being implemented and/or performing any of the functionality set forth hereinabove.

Figure 12:
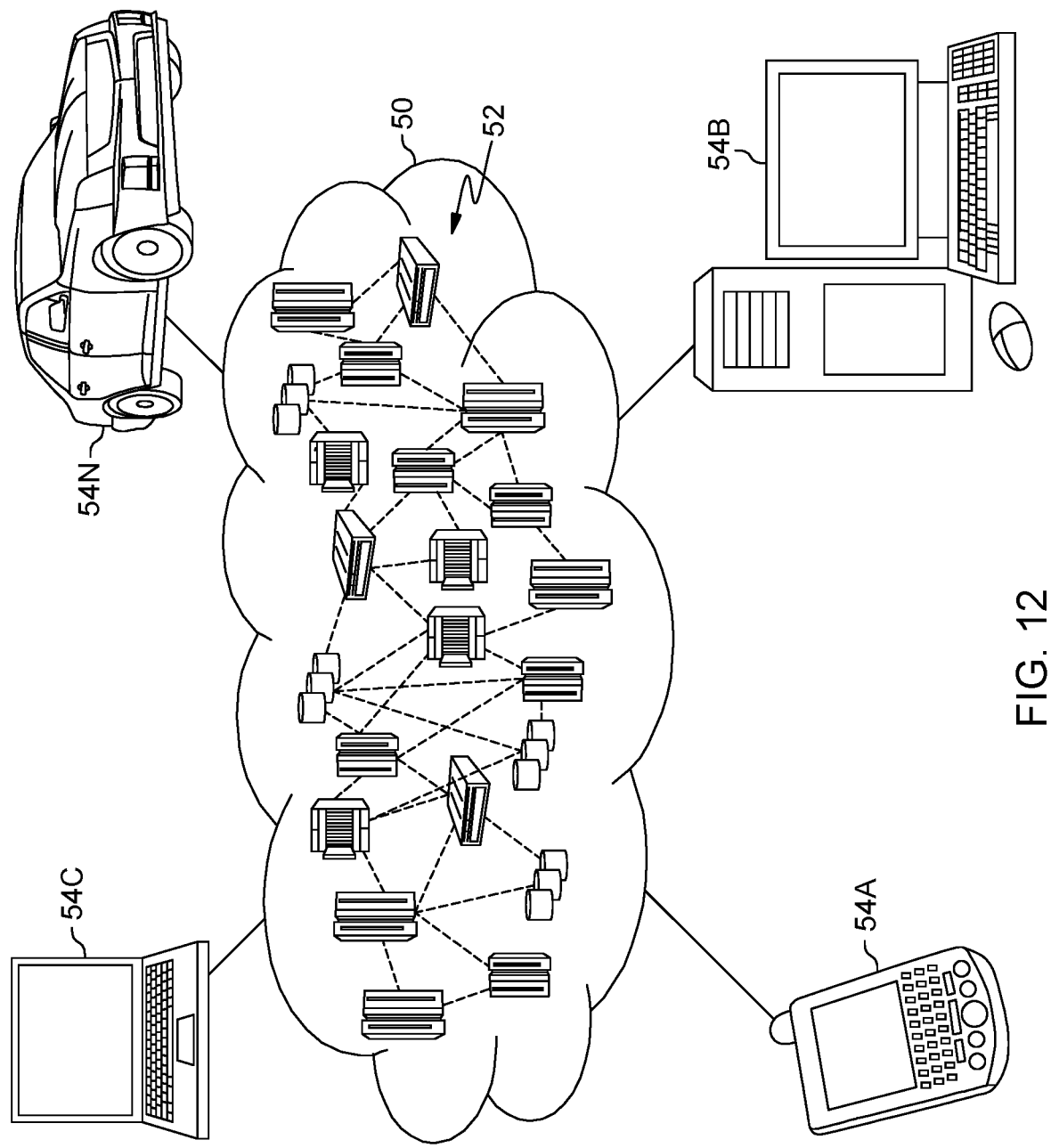
FIG. 12 depicts one embodiment of a cloud computing environment which can facilitate implementing, or be used in association with, certain aspects of an embodiment of the present invention.

Referring now to FIG. 12, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 13:
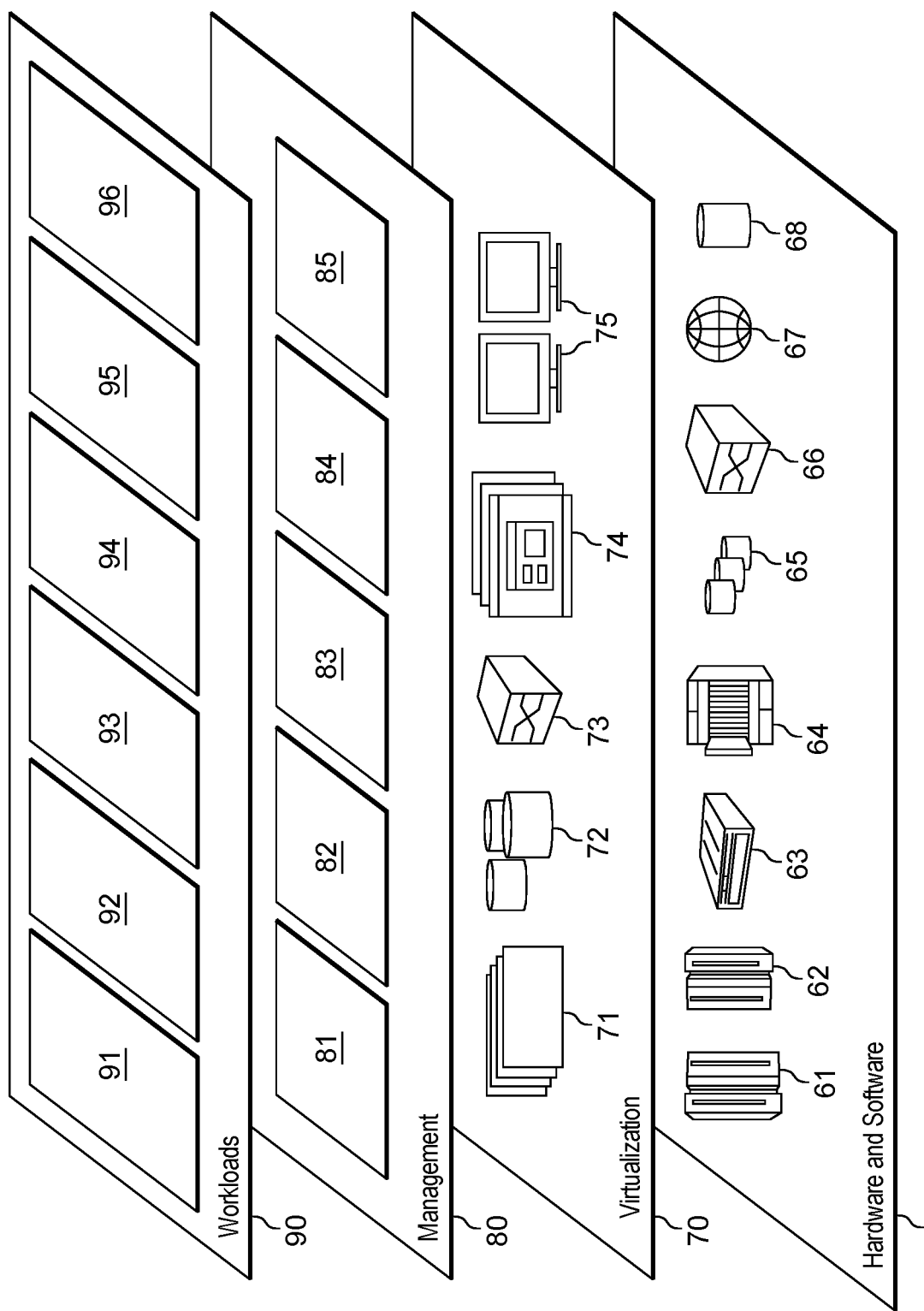
FIG. 13 depicts abstraction model layers according to an embodiment of the present invention.

Referring to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and energy-source-related, or transport-event-related processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of facilitating product transport, the method comprising:
generating and training a machine learning model to predict energy usage of a transport vehicle in performing a planned product transport event, including transporting one or more transport containers containing the product, and to determine physical size and type of energy source for inclusion in a transport container of the one or more transport containers to be transported by the transport vehicle, the generating and training the machine learning model comprising applying a machine learning algorithm to generate and train the machine learning model based on patterns and transport vehicle data, transport container data, and energy source data;
obtaining, by one or more processors, data related to the planned product transport event;
using the machine learning model to analyze, by the one or more processors, the data and predict the energy usage of the transport vehicle in performing the planned product transport event, including transporting the one or more transport containers;
using the machine learning model to determine, by the one or more processors, based at least in part on the predicted energy usage, the physical size and type of energy source for the transport container of the one or more transport containers to be transported by the transport vehicle, the physical size and type of energy source being one physical size and type of energy source of a plurality of physical sizes and types of energy sources configured for integration into the transport container; and
determining, by the one or more processors, whether the transport vehicle is to proceed with the planned product transport event of transporting the one or more transport containers, the determining whether to proceed being based, at least in part, on the one or more processors determining that the energy source of the determined physical size and type is integrated within the transport container, the integrated energy source being adapted in the transport container to contribute energy to the transport vehicle with the transport container positioned within the transport vehicle for transport.

2. The method of claim 1, wherein the transport vehicle has an associated transport vehicle energy source, and wherein the integrated energy source within the transport container is a supplemental energy source to the transport vehicle energy source.

3. The method of claim 2, wherein the determining, by the one or more processors, the physical size and type of the energy source for the transport container is based, at least in part, on a transport route to be taken by the transport vehicle during the planned product transport event, and on available energy of the associated transport vehicle energy source.

4. The method of claim 3, wherein the transport vehicle is to transport multiple transport containers with respective integrated energy sources, and wherein the method further comprises controlling, by the one or more processors, use of energy from the respective integrated energy sources by the transport vehicle during transport, the controlling including determining the transport route, and using, at least in part, energy from the respective integrated energy sources to power the transport vehicle prior to delivery thereof.

5. The method of claim 2, further comprising integrating the energy source into the transport container to contribute energy to the transport vehicle during the planned product transport event.

6. The method of claim 5, wherein the transport vehicle is an electric transport vehicle, and the energy source is a battery, and wherein the method further comprises confirming, by the one or more processors, that the battery integrated in the transport container is in a charged state prior to the planned product transport event.

7. The method of claim 6, wherein the obtaining comprises obtaining, by the one or more processors, battery type data, and the method further comprises determining, by the one or more processors, based at least in part on the predicted energy usage, a battery type for the energy source using the battery type data, the battery being of the determined battery type, and the determined battery type being one battery type of multiple battery types available for integration into the transport container.

8. The method of claim 6, wherein the data obtained, by the one or more processors, includes battery data, and the method further includes evaluating, by the one or more processors, the battery data, including specified data for a particular battery, historical use data for the particular battery, and charge test data for the particular battery, where the particular battery is the integrated energy source within the transport container.

9. The method of claim 8, wherein the obtaining comprises receiving, by the one or more processors, the battery data, at least in part, within a blockchain block.

10. The method of claim 1, wherein the transport vehicle is to deliver multiple transport containers as part of the planned product transport event, and the method further comprises controlling, by the one or more processors, an order of delivery of the multiple transport containers and a transport route taken by the transport vehicle in performing the planned product transport event to delay delivery of the transport container with the integrated energy source to obtain additional time in transport for the integrated energy source to contribute energy to the transport vehicle.

11. A system of facilitating product transport, the system comprising:
a memory;
one or more processors in communication with the memory; and
program instructions executable by the one or more processors via the memory to perform a method, the method comprising:
generating and training a machine learning model to predict energy usage of a transport vehicle in performing a planned product transport event, including transporting one or more transport containers containing the product, and to determine physical size and type of energy source for inclusion in a transport container of the one or more transport containers to be transported by the transport vehicle, the generating and training the machine learning model comprising applying a machine learning algorithm to generate and train the machine learning model based on patterns and transport vehicle data, transport container data, and energy source data;
obtaining, by one or more processors, data related to the planned product transport event;
using the machine learning model to analyze, by the one or more processors, the data and predict the energy usage of the transport vehicle in performing the planned product transport event, including transporting the one or more transport containers;
using the machine learning model to determine, by the one or more processors, based at least in part on the predicted energy usage, the physical size and type of energy source for the transport container of the one or more transport containers to be transported by the transport vehicle, the physical size and type of energy source being one physical size and type of energy source of a plurality of physical sizes and types of energy sources configured for integration into the transport container; and
determining, by the one or more processors, whether the transport vehicle is to proceed with the planned product transport event of transporting the one or more transport containers, the determining whether to proceed being based, at least in part, on the one or more processors determining that the energy source of the determined physical size and type is integrated within the transport container, the integrated energy source being adapted in the transport container to contribute energy to the transport vehicle with the transport container positioned within the transport vehicle for transport.

12. The system of claim 11, wherein the transport vehicle has an associated transport vehicle energy source, and wherein the integrated energy source within the transport container is a supplemental energy source to the transport vehicle energy source.

13. The system of claim 12, wherein the determining, by the one or more processors, the physical size and type of the energy source for the transport container is based, at least in part, on a transport route to be taken by the transport vehicle during the planned product transport event, and on available energy of the associated transport vehicle energy source.

14. The system of claim 13, wherein the transport vehicle is to transport multiple transport containers with respective integrated energy sources, and wherein the method further comprises controlling, by the one or more processors, use of energy from the respective integrated energy sources by the transport vehicle during transport, the controlling including determining the transport route, and using, at least in part, energy from the respective integrated energy sources to power the transport vehicle prior to delivery thereof.

15. The system of claim 12, wherein the transport vehicle is an electric transport vehicle, and the energy source is a battery, and wherein the method further comprises confirming, by the one or more processors, that the battery integrated in the transport container is in a charged state prior to the planned product transport event.

16. The system of claim 15, wherein the obtaining comprises obtaining, by the one or more processors, battery type data, and the method further comprises determining, by the one or more processors, based at least in part on the predicted energy usage, a battery type for the energy source using the battery type data, the battery being of the determined battery type, and the determined battery type being one battery type of multiple battery types available for integration into the transport container.

17. The system of claim 15, wherein the data obtained, by the one or more processors, includes battery data, and the method further includes evaluating, by the one or more processors, the battery data, including specified data for a particular battery, historical use data for the particular battery, and charge test data for the particular battery, where the particular battery is the integrated energy source within the transport container.

18. The system of claim 11, wherein the transport vehicle is to deliver multiple transport containers as part of the planned product transport event, and the method further comprises controlling, by the one or more processors, an order of delivery of the multiple transport containers and a transport route taken by the transport vehicle in performing the planned product transport event to delay delivery of the transport container with the integrated energy source to obtain additional time in transport for the integrated energy source to contribute energy to the transport vehicle.

19. A computer program product device comprising:
a computer-readable storage medium having computer-readable code embodied therein, the computer-readable code being executable by one or more processors to cause the one or more processors to:
generate and train a machine learning model to predict energy usage of a transport vehicle in performing a planned product transport event, including transporting one or more transport containers containing the product, and to determine physical size and type of energy source for inclusion in a transport container of the one or more transport containers to be transported by the transport vehicle, the generating and training the machine learning model comprising applying a machine learning algorithm to generate and train the machine learning model based on patterns and transport vehicle data, transport container data, and energy source data;
obtain, by one or more processors, data related to the planned product transport event;
use the machine learning model to analyze, by the one or more processors, the data and predict the energy usage of the transport vehicle in performing the planned product transport event, including transporting the one or more transport containers;
use the machine learning model to determine, by the one or more processors, based at least in part on the predicted energy usage, the physical size and type of energy source for the transport container of the one or more transport containers to be transported by the transport vehicle, the physical size and type of energy source being one physical size and type of energy source of a plurality of physical sizes and types of energy sources configured for integration into the transport container; and
determine, by the one or more processors, whether the transport vehicle is to proceed with the planned product transport event of transporting the one or more transport containers, the determining whether to proceed being based, at least in part, on the one or more processors determining that the energy source of the determined physical size and type is integrated within the transport container, the integrated energy source being adapted in the transport container to contribute energy to the transport vehicle with the transport container positioned within the transport vehicle for transport.

20. The computer program product device of claim 19, wherein the transport vehicle is to deliver multiple transport containers as part of the planned product transport event, and the computer-readable code being executable by the one or more processors further cause the one or more processors to control an order of delivery of the multiple transport containers and a transport route taken by the transport vehicle in performing the planned product transport event to delay delivery of the transport container with the integrated energy source to obtain additional time in transport for the integrated energy source to contribute energy to the transport vehicle.

* * * * *